(12) United States Patent
Hartmann et al.

(10) Patent No.: US 11,210,861 B2
(45) Date of Patent: Dec. 28, 2021

(54) METHOD FOR ADJUSTING AND VISUALIZING PARAMETERS FOR FOCUSING AN OBJECTIVE LENS ON AN OBJECT AND SYSTEM FOR IMPLEMENTING THE METHOD

(71) Applicant: Carl Zeiss AG, Oberkochen (DE)

(72) Inventors: Benedikt Hartmann, Schwaebisch Gmuend (DE); Joachim Welker, Heidenheim (DE); Christoph Stark, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 84 days.

(21) Appl. No.: 16/860,899

(22) Filed: Apr. 28, 2020

(65) Prior Publication Data

US 2020/0357181 A1   Nov. 12, 2020

(30) Foreign Application Priority Data

Apr. 30, 2019 (DE) ...................... 10 2019 111 238.9

(51) Int. Cl.
*G06T 19/00* (2011.01)
*G06T 7/571* (2017.01)
*G06F 3/01* (2006.01)

(52) U.S. Cl.
CPC ............ *G06T 19/006* (2013.01); *G06T 7/571* (2017.01); *G06F 3/013* (2013.01)

(58) Field of Classification Search
CPC ............ G02B 27/0025; G02B 19/0014; G02B 26/10; G02B 26/101; G02B 26/105;
(Continued)

(56) References Cited

U.S. PATENT DOCUMENTS

2008/0186551 A1* 8/2008 Hanft ..................... G02B 26/10
                                                        359/205.1
2011/0267583 A1* 11/2011 Hayashi ............. G01B 9/02044
                                                        351/206
(Continued)

FOREIGN PATENT DOCUMENTS

DE   10 2013 227 197 A1   7/2015
DE   10 2014 105 011 A1   10/2015
(Continued)

OTHER PUBLICATIONS

Wikipedia, "Circle of Diffusion", ("Zerstreuungskreis"), last modified on Feb. 17, 2018, https://de.wikipedia.Org/w/index.php?title=Zerstreuungskreis&oldid=174114889, Sep. 24, 2018, pp. 1 to 4, with English translation.
(Continued)

*Primary Examiner* — Ming Wu
(74) *Attorney, Agent, or Firm* — Walter Ottesen, P.A.

(57) ABSTRACT

The disclosure relates to a method for setting and visualizing parameters of an objective lens of a camera, in particular for focusing on a moving object, and to a system for performing the method. The camera is, for example, embodied as a film camera, in particular as a film camera used in cinematography. The method includes the following steps: calcu-lating a relative position and an alignment of a depth of field of the objective lens in the 3D space, observing the 3D space and/or the object with an AR display and observation de-vice, displaying the relative position and the alignment of the depth of field of the objective lens as an image in the AR display and observation device and/or displaying a focal plane as an image in the AR display and observation device, and setting the objective lens to ob-tain a desired depth of field of the objective lens.

23 Claims, 17 Drawing Sheets

(58) Field of Classification Search
CPC ...... G02B 27/10; G02B 7/10; G02B 17/0892; G02B 21/0056; G02B 21/025; G02B 27/0927; G02B 27/095; G01B 9/0203; G01B 9/02091; G01B 9/02004; G01B 9/02032; G01B 9/02035; G01B 9/02043; G01B 9/02044; G01B 9/02072; G01B 9/02077; G01B 9/02085; G01B 9/02097; G01N 2021/458; G01N 21/4795; G03F 7/70225
See application file for complete search history.

(56) References Cited

U.S. PATENT DOCUMENTS

| | | | |
|---|---|---|---|
| 2013/0265547 A1* | 10/2013 | Higuchi | G01B 9/0203 351/208 |
| 2013/0286004 A1 | 10/2013 | McCulloch et al. | |
| 2017/0105618 A1* | 4/2017 | Schmoll | G01B 9/02097 |
| 2017/0201808 A1 | 7/2017 | Chowdhary et al. | |
| 2017/0212585 A1 | 7/2017 | Kim et al. | |
| 2017/0274277 A1 | 9/2017 | Vandonkelaar | |
| 2017/0294039 A1 | 10/2017 | Yajima et al. | |
| 2018/0367769 A1* | 12/2018 | Greenberg | H04N 9/317 |

FOREIGN PATENT DOCUMENTS

| | | |
|---|---|---|
| DE | 10 2017 004 658 A1 | 11/2018 |
| WO | 2017/189450 A1 | 11/2017 |

OTHER PUBLICATIONS

Cooke i Technology, "User's Guide & Technical Manual", Version 4.0, Apr. 2016, cookeoptics.com, in particular pp. 19 and 41, pp. 0 to 77.

English translation and Office action of the German Patent Office dated Jan. 15, 2020 in German patent application 10 2019 111 238.9 on which the claim of priority is based.

From Virtual Reality and Augmented Reality Wiki, "Inside-out tracking", last modified on Jan. 16, 2020, https://xinreality.com/wiki/Inside-out_tracking, 3 pages.

Langley, H., "Inside-out v Outside-in: How VR tracking works, and how it's going to change", https://www.wareable.com/vr/inside-out-vs-outside-in-tracking-343, copyright Wareable Ltd., May 3, 2017, pp. 1 to 7.

Extract, "Internet discussion on Microsoft Hololens_reported on Jun. 14, 2017.docx", https://www.reddit.com/r/HoloLens/comments/3aekn3/eli5_how_the_hell_does_the_realtime_tracking_work/, two pages.

Canon Inc., "Optical Terminology", EF Lens Work III, The Eyes of EOS, Sep. 2006, Eighth edition, pp. 192 to 215.

From Virtual Reality and Augmented Reality Wiki, "Outside-in tracking", last modified Mar. 20, 2018, https://xinreality.com/wiki/Outside-in_tracking, 3 pages.

Wikipedia, "Pose (technique)", https://de.wikipedia.org/wiki/Pose_(Technik), last modified on Oct. 20, 2017, one page, with English translation.

Couche, Guillaum E., "Show-Focus: Future of filmmaking", http://guillamecouche.com/show-focus-future-of-filmmaking, May 2013, pp. 1 to 12.

Wikipedia, "Simultaneous Localization and Mapping", (SLAM), last modified Dec. 12, 2016, https://de.wikipedia.org/wiki/Simultaneous_Localization_and_Mapping, 4 pages, with English translation.

Tom's Hardware, "What's Inside Microsoft's HoloLens And How It Works", Livestream May 8, 2020, https://www.tomshardware.com/news/microsoft-hololens-components-hpu-28nm,32546.html, pp. 1 to 6.

From Virtual Reality and Augmented Reality Wiki, "Virtual Reality", last modified Oct. 18, 2017, https://xinreality.com/wiki/Virtual_Reality#Devices, 8 pages.

YouTube video: "Pure IMU-based Positional Tracking is a No-go", uploaded on Jun. 5, 2014, posted by okreylos, https://www.youtube.com/watch?v=_q_8d0E3tDk, 1 page screen snapshot attached.

* cited by examiner

METHOD FOR ADJUSTING AND VISUALIZING PARAMETERS FOR FOCUSING AN OBJECTIVE LENS ON AN OBJECT AND SYSTEM FOR IMPLEMENTING THE METHOD

CROSS REFERENCE TO RELATED APPLICATION

This application claims the priority of the German patent application No. 10 2019 111 238.9, filed on Apr. 30, 2019, which is hereby incorporated by reference.

FIELD OF THE INVENTION

The disclosure relates to a method for setting and visualizing parameters of an objective lens of a camera, in particular for focusing on a moving object. Further, the disclosure relates to system for performing the aforementioned method. By way of example, the camera is embodied as a film camera, in particular as a film camera used in the field of cinematography. In a further embodiment, the camera is embodied, for example, as a camera that is used in the field of photography.

BACKGROUND OF THE INVENTION

The practice of setting parameters of an objective lens manually or in motor-controlled fashion has already been known for a long time from the prior art. By way of example, the focal length and/or the aperture unit of an objective lens are set in manual or motor-controlled fashion. Further, the practice of setting the recording distance—that is, the distance between an object plane and an image plane—is known.

Moreover, stylistic means are known in photography and cinematography, the intention of which is to draw the attention of an observer of an image or of a film to a certain content of an image or to design this content of the image in a special way for an observer in order to obtain a sophisticated aesthetic impression. In order to achieve this, the prior art has disclosed the practice of producing an image of an object using a very special objective lens or special objective lenses. By way of example, objective lenses with a large aperture are advantageous in photography and cinematography, not only due to the high light intensity but also because they can produce images with a small depth of field. The depth of field is a region in front of an objective lens of a camera, with the objective lens being used for imaging an object. If an object is located within this region—that is, within the depth of field—it is imaged in focus by the objective lens. An object located in this region is represented in focus in the image by focusing the objective lens on the object, with the space outside of the depth of field basically becoming blurry on account of the unsharpness in the image. As a result of this, the attention of an observer is steered to the sharp image region of the object. Expressed differently, it is possible to image an object sharply by focusing the objective lens on a very special object plane, to be precise while simultaneously imaging the portions of the object in front of and behind the object plane out of focus. These portions are imaged out of focus.

The objective lens of the aforementioned camera has at least one lens unit and at least one aperture unit, which is provided with an aperture. The depth of field of the objective lens is limited by a near focal point (also referred to as near point below) and a far focal point (also referred to as far point below). The extent of the depth of field parallel to an optical axis of the objective lens is specified by the difference between a far point distance and a near point distance. The far point distance is the distance between the objective lens (ideally a principal plane of the objective lens) and a first plane, which is aligned perpendicular to the optical axis of the objective lens and in which the far point is disposed. The near point distance is the distance between the objective lens (ideally the principal plane of the objective lens) and a second plane, which is aligned perpendicular to the optical axis of the objective lens and in which the near point is disposed. The near point distance and the far point distance can be calculated by the following equations:

$$NF = \frac{\frac{f^2}{k \cdot C} \cdot G}{\frac{f^2}{k \cdot C} + G - f} \quad [1]$$

$$FF = \frac{\frac{f^2}{k \cdot G} \cdot G}{\frac{f^2}{k \cdot C} - G - f} \quad [2]$$

where
NF corresponds to the near point distance,
FF corresponds to the far point distance,
f corresponds to the focal length of the objective lens,
k corresponds to the f-number of the objective lens, specified by k=f/D, where f is the focal length and D is the diameter of the entrance pupil of the objective lens,
C is the radius of the smallest circle of confusion, and where
G is the object distance. Accordingly, the object distance corresponds to the distance between an object plane and the principal plane of the objective lens.

In respect of the aforementioned quantities, reference is also made to FIG. 1, which illustrates an objective lens 1 and in which the aforementioned quantities are illustrated schematically.

In the case of an approximate consideration of the depth of field, the following relationships can be derived:
(i) the greater the focal length, the smaller the depth of field;
(ii) the smaller the distance between the object and the objective lens, the smaller the depth of field;
(ii) the smaller the f-number of the objective lens, the smaller the depth of field;
(ii) the smaller the radius of the circle of confusion, the smaller the depth of field.

The circle of confusion is explained in more detail below on the basis of FIG. 2. Light rays from an object O to be imaged strike an image capture unit BE of a camera. An objective lens 1 is focused on a first object plane 2. Accordingly, the first object plane 2 is imaged in focus. By contrast, a second object plane 3 is imaged out of focus. In the direction of the arrow P, the light rays from the first object plane 2 and the second object plane 3 enter through the objective lens 1 in the direction of the image plane of the image capture unit BE. FIG. 2 illustrates, in exemplary fashion, light rays that originate from object points of the two object planes 2 and 3, which are located on an optical axis OA. As a rule, the image plane of the image capture unit BE intersects a light cone of the rays, which emanate from an object point and are focused by the objective lens 1, at a certain distance from a cone tip. Then, the circle of confusion arises on the image plane of the image capture unit BE, the circle of confusion having the radius R. In the aforementioned equations [1] and [2], the smallest circle of confusion is denoted by C. The radius R has its origin on the optical axis OA. It is possible to mathematically derive that the following relationship applies to the radius R in relation to the object space:

$$R = \frac{f^2}{k_\infty} \left| \frac{\Delta d}{(\Delta d - d_0) \cdot (d_0 + f)} \right| \quad [3]$$

where f corresponds to the focal length of the objective lens, $k_\infty$ corresponds to the f-number of the objective lens when focusing at infinity, do is a distance between a plane and the objective lens, with the objective lens being focused on this plane, and $\Delta d$ is the distance between a selected object point and the plane.

A small depth of field can be generated, in particular, by using long focal length, high aperture objective lenses in conjunction with a short object distance. However, a small depth of field is accompanied by a disadvantage. The risk of a moving object moving out of the depth of field is ever present when recording an image. Then, the object is imaged out of focus in this case. This is often undesirable.

In cinematography, camera assistants are employed to solve the aforementioned problem, the camera assistants permanently monitoring the focusing of an objective lens of a camera on the object and readjusting—that is, updating—the focusing of the objective lens on the object so that the object is always in the depth of field. In the art, these camera assistants are also referred to as "focus pullers". This term is used below for such camera assistants.

By way of example, when recording a scene with a moving object, a focus puller works directly at the objective lens of a camera, to adjust the focusing of the objective lens on the object to be imaged. In a known alternative, the focus puller uses a remote control unit, which transmits driving signals to a motor unit disposed either in the objective lens or externally on the objective lens, to set the focusing of the objective lens on the object to be imaged in remote controlled fashion. The focus puller requires a trained eye and very good feeling for distances so that they can set the focusing during the recording of a moving object in accordance with the demands of a director or a cameraman. A focus puller must acquire these abilities, often over many years. However, even with many years of experience, recordings often have to be repeated due to the wrong focusing. In film productions, this leads to delays and high costs, which is why a focus puller often is under very high emotional pressure.

The prior art has disclosed an assistance system, which is intended to assist a focus puller. The known assistance system has an active rangefinder by means of a laser. This measures the distance between the objective lens and the object to be imaged and the distance is indicated to the focus puller. The focusing of the objective lens of the camera is subsequently readjusted on the basis of the ascertained distance. However, the known assistance system envisages that the object intended to be imaged in focus is targeted by the laser. By way of example, the region of the eyes of the actor is targeted by the laser. Although this generally does not pose a particular risk to the actor, it is frequently not tolerated.

The prior art has disclosed a further assistance system to assist a focus puller. The further known assistance system likewise has an active rangefinder, the latter employing ultrasound. This also measures the distance between the objective lens and the object to be imaged. The focusing of the objective lens of the camera is readjusted on the basis of the distance.

In a yet further known assistance system, provision is made for the object to be imaged to be equipped with sensors, the position of which in space is determined by an electromagnetic field. As a result of this, it is possible to determine the distance between the object and the objective lens of the camera, and so the focusing of the objective lens of the camera can be readjusted on the basis of the ascertained distance. However, a disadvantage of this assistance system is that the functionality cannot be ensured on account of specific circumstances at the recording location, for example if steel girders or large metallic objects are present. The steel girders or the large metallic objects impair the functionality. Moreover, disturbance signals can be caused by external electromagnetic fields. Consequently, there can also be incorrect settings of the focusing.

It was found that a further disadvantage of the known assistance systems is that they modify the way of working of the focus puller, namely the anticipation of the distance and probable movement of the object and/or the camera, and the readjustment of the focus by the focus puller. Consequently, the focus puller is rather replaced than assisted by the known assistance system. Moreover, the focus can no longer be altered as desired, for example according to the specifications by a so-called director of photography (abbreviated DOP) or a cameraman. This is often undesirable since the desired artistic effect of a recording is no longer achieved when the focus puller is replaced. Expressed differently, it is often still desirable for the experience of the focus puller to be drawn upon when recording a scene of a film. By way of example, it is often desirable for the focusing of the objective lens on an object to continue to generate a certain degree of unsharpness in order to obtain certain effects, or for the focusing on the object to be implemented within a given period of time in order to leave a specific aesthetic impression with the observer.

SUMMARY OF THE INVENTION

It is an object of the disclosure to provide a method for setting and visualizing parameters for focusing an objective lens and a system for performing the method, which are largely not susceptible to errors and which assist a focus puller in such a way that their artistic way of working is not impaired, and which allow the focus puller to move substantially freely over a film set and assume an optimized position in respect of their perspective and their image angle for setting the focusing.

According to the disclosure, this object can, for example, be achieved via a method having the steps:

calculating a relative position and an alignment of a depth of field of the objective lens in a 3D space;

observing at least one of the 3D space and the object with an AR display and observation device;

at least one of displaying the relative position and the alignment of the depth of field of the objective lens as an image in the AR display and observation device and displaying a focal plane as an image in the AR display and observation device; and, setting the objective lens to obtain a desired depth of field of the objective lens.

The object can, for example, also be achieved by a computer program product having program code that, upon execution on a processor, controls a system for setting and visualizing parameters for focusing an objective lens of a camera in such a way that a method according to the disclosure is performed that calculates a relative position and an alignment of a depth of field of the objective lens in a 3D space; observes at least one of the 3D space and the object with an AR display and observation device; at least one of: displays the relative position and the alignment of the depth of field of the objective lens as an image in the AR display and observation device and displays a focal plane as an image in the AR display and observation device; and, sets the objective lens to obtain a desired depth of field of the objective lens.

The object can, for example, also be achieved via a system for setting and visualizing parameters for focusing an objective lens of a camera for performing the method according to the disclosure having: —at least one camera with an objective lens; —at least one AR display and observation device; —at least one communications device for transferring data between, firstly, at least one of the camera and the objective lens and, secondly, the AR display and observation device; —at least one processor; —a non-transitory computer readable storage medium; —a computer program including program code stored on said non-transitory computer readable storage medium; said program code being partly or completely loadable into a processor; —said program code being configured, when executed by said at least one processor, to: —calculate a relative position and an alignment of a depth of field of the objective lens in a 3D space; —observe at least one of the 3D space and the object with an AR display and observation device; —at least one of: display the relative position and the alignment of the depth of field of the objective lens as an image in the AR display and observation device and display a focal plane as an image in the AR display and observation device; and, —set the objective lens to obtain a desired depth of field of the objective lens.

The method is provided for setting and visualizing parameters for focusing an objective lens of a camera on an object. By way of example, the object is a moving object. As an alternative thereto, the object may also be disposed in stationary fashion. By way of example, the method uses a film camera, in particular a film camera used in the field of cinematography, as a camera. In a further embodiment, the camera is embodied, for example, as a camera that is used in the field of photography. By way of example, the camera has an image capture unit. By way of example, the latter is embodied as a digital image capture unit. By way of example, a CMOS sensor is suitable as an image capture unit. However, the disclosure is not restricted to such an image capture unit. Rather, any suitable image capturing unit can be used for the invention.

In the method, provision is made for a relative position and an alignment of a depth of field of the objective lens to be calculated in three-dimensional space (also referred to as 3D space below).

Further, provision is made in the method for the 3D space and/or the object to be observed with an AR display and observation device. Here, both above and below, an AR display and observation device is understood to be a so-called "augmented reality" display and observation device. This is a display and observation device which allows images to be supplemented with additional information items or virtual objects via the images being overlaid or superposed with these additional information items or virtual objects. By way of example, the AR display and observation device is embodied as a pair of spectacles, which is worn by a person. By way of example, the pair of spectacles has a dedicated power supply unit and is configured in such a way that it is able to communicate wirelessly with further units, for example a computer unit and/or the camera. By way of example, the aforementioned person who uses the AR display and observation device is a focus puller.

The disclosure is not restricted to an embodiment of the AR display and observation device as a pair of spectacles. Rather, the AR display and observation device can have any form suitable for the invention, for example also the form of a monitor.

Now, in the method, provision is made for the object to be imaged by the objective lens of the camera to be observed with the AR display and observation device. Further, the relative position and the alignment of the depth of field of the objective lens is displayed as an image in the AR display and observation device. Expressed differently, the object is observed with the AR display and observation device and the observed object is superimposed with the image that displays the relative position and the alignment of the depth of field of the objective lens. In addition or as an alternative thereto, provision is made for a focal plane to be displayed as an image in the AR display and observation device. If the relative position and absolute position of the focal plane are known and if the near point and the far point are known, a user of the AR display and observation device knows the relative position of the depth of field.

In the method, provision is also made for the objective lens to be set to obtain a desired depth of field of the objective lens. This is implemented by setting parameters of the objective lens, by means of which structural properties of the objective lens, for example the position of lens elements in the objective lens and/or the size of an aperture of the objective lens are set. Further parameters are listed below.

The invention is, for example, advantageous in that the previous way of working of the focus puller, namely the anticipation of the distance and the probable movement of the object and/or the camera, and the readjustment of the focusing by the focus puller, is not impaired by the method. This is because the depth of field displayed in the AR display and observation device assists the focus puller and does not replace the latter. The focus puller continues to adjust the focusing of the objective lens on the object. In so doing, the focus puller has all artistic freedoms. Should the focus puller identify that the object is moving out of the depth of field, for example, when observing the object with the AR display and observation device, they are able to readjust the focusing on the object in an embodiment. Thus, the focusing of the objective lens is set anew. As an alternative thereto, the focus puller can bring about a deliberate defocusing in order to obtain a specific effect in the image. By way of example, this is implemented by virtue of the focusing on the object not being readjusted or not being readjusted to an extent sufficient for focused imaging.

Should the AR display and observation device be embodied as a pair of spectacles that communicates wirelessly with further units, a focus puller has the greatest freedom of movement on a film set where the camera is used. They are not fixed to a position and can move freely on the film set. Consequently, they can readily continue to perceive a scene of the film to be recorded using their eyes, to be precise at a freely chosen location and with a viewing angle depending on the chosen location, which gives them the best possible perspective for observing and anticipating the goings-on on the film set.

Explicit reference is made to the fact that the sequence of the performance of the method steps described above and below is arbitrary. Moreover, a plurality of the method steps described above and below can also be performed in parallel with one another.

In an embodiment of the method, provision is additionally or alternatively made for focusing of the objective lens on the object to be imaged by the objective lens to be implemented when the object observed with the AR display and observation device no longer overlaps completely, or partially, with the image of the relative position and the alignment of the depth of field of the objective lens displayed in the AR display and observation device. Expressed differently, the objective lens is focused on the object to be imaged with the objective lens in this embodiment of the method when the object moves out of the depth of field.

For the purposes of focusing the objective lens on the object, provision is additionally or alternatively made in a further embodiment for at least one lens unit of the objective lens to be moved along the optical axis of the objective lens. In addition or as an alternative thereto, provision is made for the objective lens to have at least one lens group that is moved along the optical axis of the objective lens for the purposes of setting the focusing of the objective lens on the object. Here, a lens group is understood to mean, both above and below, a group having a single lens element or a plurality of lens elements. Additionally, the lens group could also have at least one prism.

In a yet further embodiment of the method, provision is additionally or alternatively made for the relative position and the alignment of the depth of field of the objective lens in 3D space to be calculated using at least one of the following parameters: (i) a distance between an image plane of the objective lens and the object, that is, the recording distance, (ii) a focal length of the objective lens, (iii) a measure for the aperture of an aperture unit of the objective lens, and (iv) a radius of the circle of confusion. By way of example, the diameter of the circle of confusion ranges from 30 µm to 60 µm. The diameter is 35 µm in a typical application. Expressed differently, the relative position and the alignment of the depth of field of the objective lens under specified conditions in respect of at least one of the aforementioned parameters is determined.

In an embodiment of the method, provision is additionally or alternatively made for the relative position and the alignment of the depth of field of the objective lens to be calculated by calculating a far point distance and a near point distance, wherein the far point distance is the distance between the objective lens and a first plane, which is aligned perpendicular to the optical axis of the objective lens and in which a far point is disposed, wherein the near point distance is the distance between the objective lens and a second plane, which is aligned perpendicular to the optical axis of the objective lens and in which a near point is disposed, and wherein the near point distance and the far point distance are specified by equations [1] and [2], which are printed again below:

$$NF = \frac{\frac{f^2}{k \cdot C} \cdot G}{\frac{f^2}{k \cdot C} + G - f}$$ [1]

$$FF = \frac{\frac{f^2}{k \cdot G} \cdot G}{\frac{f^2}{k \cdot C} - G - f}$$ [2]

where

NF corresponds to the near point distance,

FF corresponds to the far point distance, f corresponds to the focal length of the objective lens, k corresponds to the f-number of the objective lens, specified by k=f/D, where f is the focal length and D is the diameter of the entrance pupil of the objective lens, C is the radius of the smallest circle of confusion, and where G is the object distance. The object distance corresponds to the distance between an object plane and a principal plane of the objective lens.

Embodiments with respect of the display of the depth of field in the AR display and observation device are described further below.

In an embodiment of the method, provision is additionally or alternatively made for at least one parameter, specified above or listed further below, to be loaded from a data memory into a processor unit for calculating the relative position and the alignment of the depth of field of the objective lens.

In a further embodiment of the method, provision is additionally or alternatively made for information items to be transferred from a data memory, for example a data memory of the camera and/or of the objective lens, to the AR display and observation device. By way of example, the data memory is embodied as a volatile or non-volatile data memory. Further, provision is made, for example, for the data memory to have permanent data or data that is generated dynamically during a certain time of operation of the camera and/or of the objective lens. In addition or as an alternative thereto, provision is made for information items to be transferred from the AR display and observation device to the data memory, for example the data memory of the camera and/or of the objective lens. The information items are transferred as a data record using at least one communications device. By way of example, the communications device can be embodied as a radio device, which uses a transmission standard or a plurality of transmission standards on a transmission path or a plurality of transmission paths. By way of example, Bluetooth is used as a transmission standard. Further, a wireless local area network, that is, a WLAN, is used for transmission purposes. However, the disclosure is not restricted to such an embodiment of the communications device. Rather, the communications device can have any form that is suitable for the invention. By way of example, the following information items are transferred in the embodiment described here: (i) the relative position and the alignment of the depth of field of the objective lens, (ii) the distance between the objective lens and the object, (iii) the focal length of the objective lens, (iv) the measure for the aperture of the aperture unit of the objective lens, (v) the radius of the circle of confusion, (vi) the manufacturer of the objective lens, (vii) the name and/or the designation of the objective lens, (viii) a structural design of the objective lens—expressed differently, information items about the optical structure in the form of the employed optical units and/or about the electronic structure of the objective lens— and (ix) a structural configuration of an image capture unit of the camera—expressed differently, information items about the structure of the image capture unit, in particular about the size of the image capture unit.

In a yet further embodiment of the method, provision is additionally or alternatively made for at least one of the aforementioned information items to be displayed in the AR display and observation device.

In an embodiment of the method, provision is additionally or alternatively made for the calculation of the relative position and the alignment of the depth of field of the objective lens in the 3D space to be carried out by a calculation unit. In particular, provision is made here for the calculation of the relative position and the alignment of the depth of field of the objective lens in the 3D space to be carried out by the calculation unit of the AR display and observation device. In addition or as an alternative thereto, provision is made for the calculation of the relative position and the alignment of the depth of field of the objective lens in the 3D space to be carried out by the calculation unit of the camera. In a further addition or as a further alternative thereto, provision is made for the calculation of the relative position and the alignment of the depth of field of the objective lens in the 3D space to be carried out by the calculation unit of the objective lens. In addition or as an alternative thereto, provision is made for the calculation of the relative position and the alignment of the depth of field of the objective lens in the 3D space to be carried out by the calculation unit, which is spatially separated from the AR display and observation device, the camera and the objective lens.

In a further embodiment of the method, provision is a additionally or alternatively made for a so-called "inside-out tracking" to be performed using a marking, in which, using the AR display and observation device, the position of, firstly, the camera and/or the objective lens and, secondly, the AR display and observation device are determined, wherein the camera and/or the objective lens is/are provided with a marking in this embodiment. In this embodiment, provision is made for a single 3D map to be created using the AR display and observation device. Expressed differently, the 3D map is created by recording surroundings with the AR display and observation device and a first relative spatial position of the AR display and observation device within the 3D map is determined in this embodiment of the method.

The 3D map created in this embodiment of the method shows the surroundings of the AR display and observation device, that is, the objects in the surroundings captured by the AR display and observation device and the distances between the AR display and observation device and the objects in the surroundings captured by the AR display and observation device. The 3D map is created on the basis of the coordinate system of the AR display and observation device. The first relative spatial position of the AR display and observation device is determined with reference to the coordinate system of the AR display and observation device. In order to create the 3D map, use is made, for example, of a SLAM module disposed on the AR display and observation device. The abbreviation SLAM denotes "simultaneous localization and mapping". Consequently, there is simultaneous localization and mapping by means of the SLAM module. During this simultaneous localization and mapping, the 3D map of the surroundings of the AR display and observation device and a pose of the AR display and observation device in the 3D map, that is, a relative spatial position of the AR display and observation device in the 3D map, is created by means of the AR display and observation device. By way of example, the SLAM module has at least one inertial measurement unit, at least one depth camera and at least one surround camera. Reference is made to the text below in respect of the functionality of the inertial measurement unit, the depth camera and the surround camera.

Consequently, there is simultaneous localization and mapping by means of the SLAM module of the AR display and observation device. Further, provision is made in this embodiment of the method for a second relative spatial position of the camera and/or of the objective lens to be determined within the 3D map. The second relative spatial position of the camera and/or of the objective lens is determined with reference to the coordinate system of the AR display and observation device and using at least one marking disposed on the camera and/or on the objective lens. The marking is captured by means of the AR display and observation device. Consequently, it is possible to uniquely determine the distance of the camera and/or the objective lens from the AR display and observation device and the relative position of the camera and/or the objective lens with respect to the AR display and observation device. In this embodiment, the calculation of the relative position and the alignment of the depth of field of the objective lens and the display of the relative position and the alignment of the depth of field of the objective lens as an image in the AR display and observation device are implemented using the 3D map. In principle, the 3D map in this embodiment is the map used by a processor unit to calculate the data. By way of example, the processor unit is the calculation unit already mentioned further above.

In a further embodiment of the method, provision is additionally or alternatively made for the created 3D map based on the coordinate system of the AR display and observation device to be supplemented by a renewed recording of the surroundings with the AR display and observation device. Expressed differently, changes in the surroundings of the AR display and observation device are included in the 3D map. This is also referred to as continuous SLAM. Expressed yet again differently, continuous SLAM is performed with the AR display and observation device. In addition or as an alternative thereto, provision is made for the second relative spatial position of the camera and/or of the objective lens to be redetermined within the created 3D map. Accordingly, current information about the first relative spatial position of the AR display and observation device and about the second relative spatial position of the camera and/or of the objective lens is always obtained in this embodiment of the invention. Consequently, it is possible to always determine and display the current relative position and alignment of the depth of field.

In an embodiment of the method, provision is additionally or alternatively made for so-called marker-less "inside-out tracking" to be performed. Expressed differently, the position of the camera and the AR display and observation device is determined in this embodiment using, firstly, the camera or a SLAM module disposed on the camera or assigned to the camera and, secondly, the AR display and observation device, with no markings disposed fixedly in space being used in this embodiment. In this embodiment, a first 3D map is created by recording surroundings with the camera or with the SLAM module and a first relative spatial position of the camera is determined within the first 3D map. The first 3D map shows the surroundings of the camera, that is, the objects in the surroundings captured by the camera, and the distances between the objective lens and the objects in the surroundings captured by the camera. The first 3D map is created on the basis of a first coordinate system, namely the coordinate system of the camera or the SLAM module. The first relative spatial position of the camera is determined with respect to the first coordinate system. In order to create the first 3D map, use is made, for example, of the SLAM module disposed on the camera, which is referred to as first SLAM module below. Consequently, there is simultaneous localization and mapping by means of the first SLAM module. During this simultaneous localization and mapping, the first 3D map of the surroundings of the camera and a pose of the camera in the first 3D map, that is, a relative spatial position of the camera in the first 3D map, are created by means of the camera or the first SLAM module. By way of example, the first SLAM module has at least one first inertial measurement unit, at least one first depth camera and at least one first surround camera.

The first inertial measurement unit of the first SLAM module has acceleration sensors and rate sensors which facilitate a detection of a movement with 6 degrees of freedom, for example. In principle, the first inertial measurement unit is an inertial navigation system and is used to detect the movement and determine the relative position of the camera in space.

The first depth camera of the first SLAM module is used to determine the distance between the objective lens and a point in space, that is, a point in the surroundings of the camera. Since the structure of the objective lens is known, it is possible on account of the determined distance to also determine the recording distance between the image plane of the objective lens and the object. This also applies to all further embodiments described above and below. By way of example, the first depth camera is embodied as a plenoptic imaging unit, as a stereoscopic imaging unit, as a time-of-flight imaging unit (that is, as a TOF imaging unit) and/or as a unit for projecting and capturing a pattern (for example, a fringe projection or a projection of a point cloud). A plenoptic imaging unit, for example a plenoptic camera, is known from the prior art. Using a plenoptic camera, it is not only possible to determine position and the intensity of a light ray on an image capture unit but also possible to determine the direction from which the light ray is incident. A stereoscopic imaging unit, for example in the form of a stereoscopic camera, is also known from the prior art. The latter is based on the principle of stereoscopy. Further, a TOF imaging unit, for example in the form of a TOF camera, is also known from the prior art. In the case of a TOF camera, the distance between an object and the TOF camera is measured using the time-of-flight method. However, reference is made to the fact that the invention is not restricted to the use of the aforementioned imaging units for determining the distances. Rather, use can be made of any suitable method and/or any suitable imaging unit for determining the distances. By way of example, the distances could also be determined using an ultrasonic measurement unit using an ultrasonic measurement method.

The first surround camera of the first SLAM module is used to record the surroundings of the camera.

In addition or as an alternative thereto, provision is made in this embodiment of the method for a second 3D map to be created by recording the surroundings with the AR display and observation device and for a second relative spatial position of the AR display and observation device to be determined within the second 3D map. The second 3D map shows the surroundings of the AR display and observation device, that is, the objects in the surroundings captured by the AR display and observation device and the distances between the AR display and observation device and the objects in the surroundings captured by the AR display and observation device. The second 3D map is created on the basis of a second coordinate system, namely the coordinate system of the AR display and observation device. The second relative spatial position of the AR display and observation device is determined with reference to the second coordinate system. In order to create the second 3D map, use is made, for example, of a second SLAM module disposed on the AR display and observation device. There is simultaneous localization and mapping by means of the second SLAM module. During this simultaneous localization and mapping, the second 3D map of the surroundings of the AR display and observation device and a pose of the AR display and observation device in the second 3D map, that is, a relative spatial position of the AR display and observation device in the second 3D map, is created by means of the AR display and observation device.

By way of example, the second SLAM module has at least one second inertial measurement unit, at least one second depth camera and at least one second surround camera.

The second inertial measurement unit of the second SLAM module has acceleration sensors and rate sensors which facilitate a detection of a movement with 6 degrees of freedom, for example. In principle, the second inertial measurement unit is an inertial navigation system and is used to detect the movement and determine the relative position of the AR display and observation device in space.

The second depth camera of the second SLAM module is used to determine the distance between the AR display and observation device and a point in space, that is, a point in the surroundings of the AR display and observation device. By way of example, the second depth camera is embodied as a plenoptic imaging unit, as a stereoscopic imaging unit, as a time-of-flight imaging unit (that is, as a TOF imaging unit) and/or as a unit for projecting and capturing a pattern (for example, a fringe projection or a projection of a point cloud). The statements already made above apply accordingly in respect of the aforementioned imaging units.

The second surround camera of the second SLAM module is used to record the surroundings of the AR display and observation device.

Moreover, provision is additionally or alternatively made in this embodiment for the calculation and display of the relative position and the alignment of the depth of field as an image in the AR display and observation device to be implemented using a coordinate transformation between the first coordinate system and the second coordinate system. When transferring data from the camera or the objective lens to the AR display and observation device, and vice versa, that is, data from the AR display and observation device to the camera or to the objective lens, use is made accordingly of the coordinate transformation between the first coordinate system and the second coordinate system.

In an embodiment of the method, provision is additionally or alternatively made for the created first 3D map to be supplemented by a renewed recording of the surroundings with the camera or the SLAM module disposed on the camera or assigned to the camera. Furthermore, provision is additionally or alternatively made for the second 3D map to be supplemented by renewed recording of the surroundings with the AR display and observation device. Expressed differently, changes in the surroundings of the camera and/or AR display and observation device are included in the respective 3D map. This is also referred to as continuous SLAM. Expressed yet again differently, continuous SLAM is performed with both, firstly, the camera or the SLAM module disposed on the camera or assigned to the camera and, secondly, the AR display and observation device. Moreover, provision is additionally or alternatively made for the relative position and the alignment of the depth of field of the objective lens as image to be displayed in the AR display and observation device taking account of a change in the position of the camera.

In a further embodiment of the method, provision is additionally or alternatively made for a first 3D map yet again to be created by recording the surroundings with the camera or a SLAM module disposed on the camera or assigned to the camera and for a first relative spatial position of the camera to be determined within the first 3D map. The first 3D map shows the surroundings of the camera, that is, the objects in the surroundings captured by the camera, and the distances between the objective lens and the objects in the surroundings captured by the camera. The first 3D map is created on the basis of the first coordinate system, namely the coordinate system of the camera or the SLAM module. The first relative spatial position of the camera is determined with respect to the first coordinate system. As mentioned above, a first SLAM module disposed on the camera is used, for example, to create the first 3D map. Further, a second 3D map is created in turn by recording the surroundings with the AR display and observation device and a second relative spatial position of the AR display and observation device is determined within the second 3D map. The second 3D map shows the surroundings of the AR display and observation device, that is, the objects in the surroundings captured by the AR display and observation device and the distances between the AR display and observation device and the objects in the surroundings captured by the AR display and observation device. The second 3D map is created on the basis of a second coordinate system, namely the coordinate system of the AR display and observation device. The second relative spatial position of the AR display and observation device is determined with reference to the second coordinate system. In order to create the second 3D map, use is made, for example, of a second SLAM module disposed on the AR display and observation device. In this embodiment of the method, a point in the 3D space is now selected by the first SLAM module of the camera. This point and its associated local coordinate system are described, and recorded, as accurately as possible on account of characteristic features of the 3D space. Any feature can be used as a characteristic feature. By way of example, markings or peculiarities on furniture or further objects can be used as characteristic features. The characteristic features are transferred from the first SLAM module of the camera to the second SLAM module of the AR display and observation device and stored in a data memory of the second SLAM module and, where necessary, processed further by the second SLAM module. If the second SLAM module now identifies the features that are characteristic for the point and the local coordinate system, then the second SLAM module can calculate the position and the relative position of the point and of the local coordinate system in the second coordinate system of the AR display and observation device, which substantially corresponds to the coordinate system of the second SLAM module. Additionally or alternatively, provision is made for a point set by the second SLAM module, for example a so-called anchor point, to be transferred from the second SLAM module to the first SLAM module. It is advantageous in the aforementioned embodiment that the first SLAM module is able to determine the relative position of the second SLAM module and the second SLAM module is able to determine the relative position of the first SLAM module.

In a yet further embodiment of the method, provision is additionally or alternatively made for, firstly, the relative position of the camera and/or of the objective lens and/or, secondly, the relative position of the AR display and observation device to be determined with the aid of units of a global navigation satellite system. By way of example, the global navigation satellite system comprises GPS, DGPS, GLONASS and GALILEO. Expressed differently, a first relative spatial position of the camera or of the objective lens is determined using a first inertial measurement unit and a unit of the global navigation satellite system in this embodiment of the method. The first inertial measurement unit and the first unit of the global navigation satellite system are disposed on the camera and/or on the objective lens. Further, provision is made for a second relative spatial position of the AR display and observation device to be determined using a second inertial measurement unit and a second unit of the global navigation satellite system. The second inertial measurement unit and the second unit of the global navigation satellite system are disposed on the AR display and observation device. The statements already made above apply accordingly in respect of the first inertial measurement unit. The first inertial measurement unit is used to detect the movement of the camera and/or of the objective lens. The first unit of the global navigation satellite system is used to determine the position of the camera and/or of the objective lens. By contrast, the second inertial measurement unit is used to detect the movement of the AR display and observation device. The second unit of the global navigation satellite system is used to determine the position of the AR display and observation device. Calculating the relative position and the alignment of the depth of field of the objective lens and/or displaying the relative position and the alignment of the depth of field of the objective lens as an image in the AR display and observation device is implemented using the first relative spatial position of the camera and/or of the objective lens and using the second relative spatial position of the AR display and observation device.

In a further embodiment of the method, provision is additionally or alternatively made for a first point to be set in a desired depth of field, to be precise by (i) observing the first point with the AR display and observation device and determining the position of the point, and/or by (ii) marking the first point by means of a manual unit. By way of example, the manual unit is embodied as a measurement system with 6 degrees of freedom, which has a button. The first point is set by pressing the button. By way of example, a virtual target marker is overlaid in the AR display and observation device in a manner fitting to the movement of the manual unit. The first point is set by pressing the button when the first point covers the virtual target marker. In addition or as an alternative thereto, the virtual target marker can also be moved by way of the movement of the AR display and observation device. In a further addition or as a further alternative thereto, for example, an eye tracker, which identifies the eye movement of a user of the AR display and observation device, can be used to move the target marker. However, the invention is not restricted to such a configuration of the manual unit. Rather, any manual unit suitable for the invention can be used as manual unit.

In an embodiment of the method, provision is made, additionally or alternatively, for the method to have at least one of the following steps: (i) displaying the first point in the AR display and observation device, (ii) displaying the distance between the first point and the image plane in the AR display and observation device, and (iii) setting the objective lens to obtain the desired depth of field using the distance between the first point and the image plane.

In a further embodiment of the method, provision is additionally or alternatively made for virtual markings to be displayed in the AR display and observation device, wherein the object will move along these virtual markings. This embodiment is advantageous, in particular, if the object to be imaged with the objective lens is in motion, for example a moving actor or a moving prop. The virtual markings help the focus puller better set the depth of field, which has to be repeatedly set anew on account of the movement, and better estimate the situation of the recording, that is, the imaging of the object. The virtual markings can take any form, for example they can be embodied as points or arrows. By way of example, the virtual markings may have been programmed before the imaging of the object and/or are calculated by a computer from movements, which are assembled from empirical values, for example, and/or on the basis of physical laws. However, the virtual markings could also represent objects that are subsequently worked into the recording by special effects. This also aids the focus puller with being able to better estimate the situation of the recording, that is, the imaging of the object.

In a yet further embodiment of the method, provision is additionally or alternatively made for imaging properties of the objective lens to be loaded from a further data memory into the AR display and observation device. Further, the object is observed with the AR display and observation device using the imaging properties of the objective lens. In this embodiment, provision is made, in particular, for typical properties of the objective lens, in particular image angles and/or aberrations, to be loaded from the further data memory, which may be programmed as an app, for example. The AR display and observation device now emulates a virtual objective lens and displays an image of the object, as would be produced with the imaging properties of the objective lens.

The invention also relates to a computer program product, which is partly or completely loadable or loaded into a processor and which, upon execution in the processor, controls a system for setting and visualizing parameters for focusing an objective lens of a camera on an object in such a way that a method having at least one of the features mentioned above or mentioned further below or having a combination of at least two of the features mentioned further above or further below is carried out.

The invention also relates to a system for setting and visualizing parameters for focusing an objective lens of a camera on an object. The system comprises at least one camera with an objective lens. By way of example, the camera is embodied as a film camera, in particular as a film camera used in the field of cinematography. In a further embodiment, the camera is embodied, for example, as a camera that is used in the field of photography. By way of example, the camera has an image capture unit. By way of example, the latter is embodied as a digital image capture unit. By way of example, a CMOS sensor is suitable as an image capture unit. However, the invention is not restricted to such an image capture unit. Rather, any suitable image capture unit can be used for the invention.

By way of example, the objective lens of the camera of the system has at least one lens unit, which is embodied to be movable along an optical axis of the objective lens for the purposes of focusing the objective lens on the object. In addition or as an alternative thereto, provision is made for the objective lens to have at least one lens group that is moved along the optical axis of the objective lens for the purposes of setting the focusing of the objective lens on the object.

Further, the system has at least one AR display and observation device. By way of example, the AR display and observation device is embodied as a pair of spectacles, which is worn by a person. Reference is also made to the explanations provided above in respect of the properties of the pair of spectacles. By way of example, the person wearing the pair of spectacles is a focus puller. However, the invention is not restricted to an embodiment of the AR display and observation device as a pair of spectacles. Rather, the AR display and observation device can have any form suitable for the invention, for example also the form of a monitor, tablet or smartphone.

Moreover, the system has at least one communications device for transferring data between, firstly, the camera and/or the objective lens and, secondly, the AR display and observation device. Accordingly, the communications device is used to transfer data between the camera and the AR display and observation device and/or between the objective lens and the AR display and observation device. By way of example, the communications device can be embodied as a radio device, which uses a transmission standard or a plurality of transmission standards on a transmission path or a plurality of transmission paths. By way of example, Bluetooth is used as a transmission standard. Further, a wireless local area network, that is, a WLAN, is used for transmission purposes. However, the invention is not restricted to such an embodiment of the communications device. Rather, the communications device can have any form that is suitable for the invention.

Further, the system has at least one processor, on which a computer program product with at least one of the features specified further above or yet to be specified below or with a combination of at least two of the features specified further above or yet to be specified below, is partly or completely loaded.

In an embodiment of the system, provision is additionally or alternatively made for the communications device to be embodied to transfer data between the objective lens and an inertial measurement unit.

In a further embodiment of the system, provision is additionally or alternatively made for the system to have at least one of the following features: at least one first inertial measurement unit, at least one first depth camera, at least one first surround camera and/or at least one first unit of a global navigation satellite system. In respect of the first inertial measurement unit, the first depth camera, the first surround camera and the first unit of the global navigation satellite system, reference is made to the observations further above, which apply here accordingly.

In yet a further embodiment of the system, provision is additionally or alternatively made for the AR display and observation device to have at least one of the following features: at least one second inertial measurement unit, at least one second depth camera, at least one second surround camera and/or at least one second unit of a global navigation satellite system. In respect of the second inertial measurement unit, the second depth camera, the second surround camera and the second unit of the global navigation satellite system, reference is made to the observations further above, which apply here accordingly.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
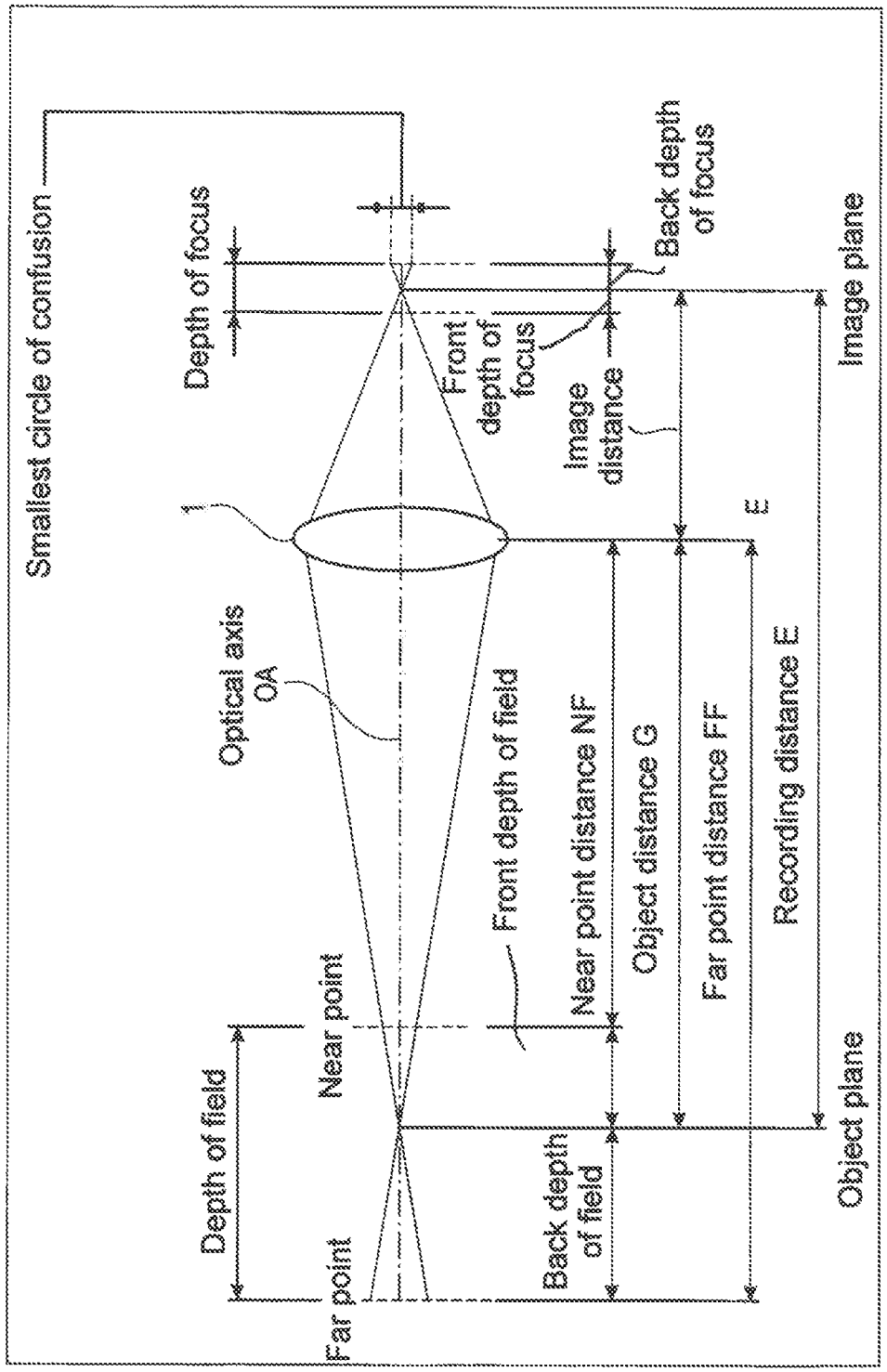
FIG. 1 shows a schematic illustration of an objective lens of a camera for explaining the depth of field.
Figure 2:
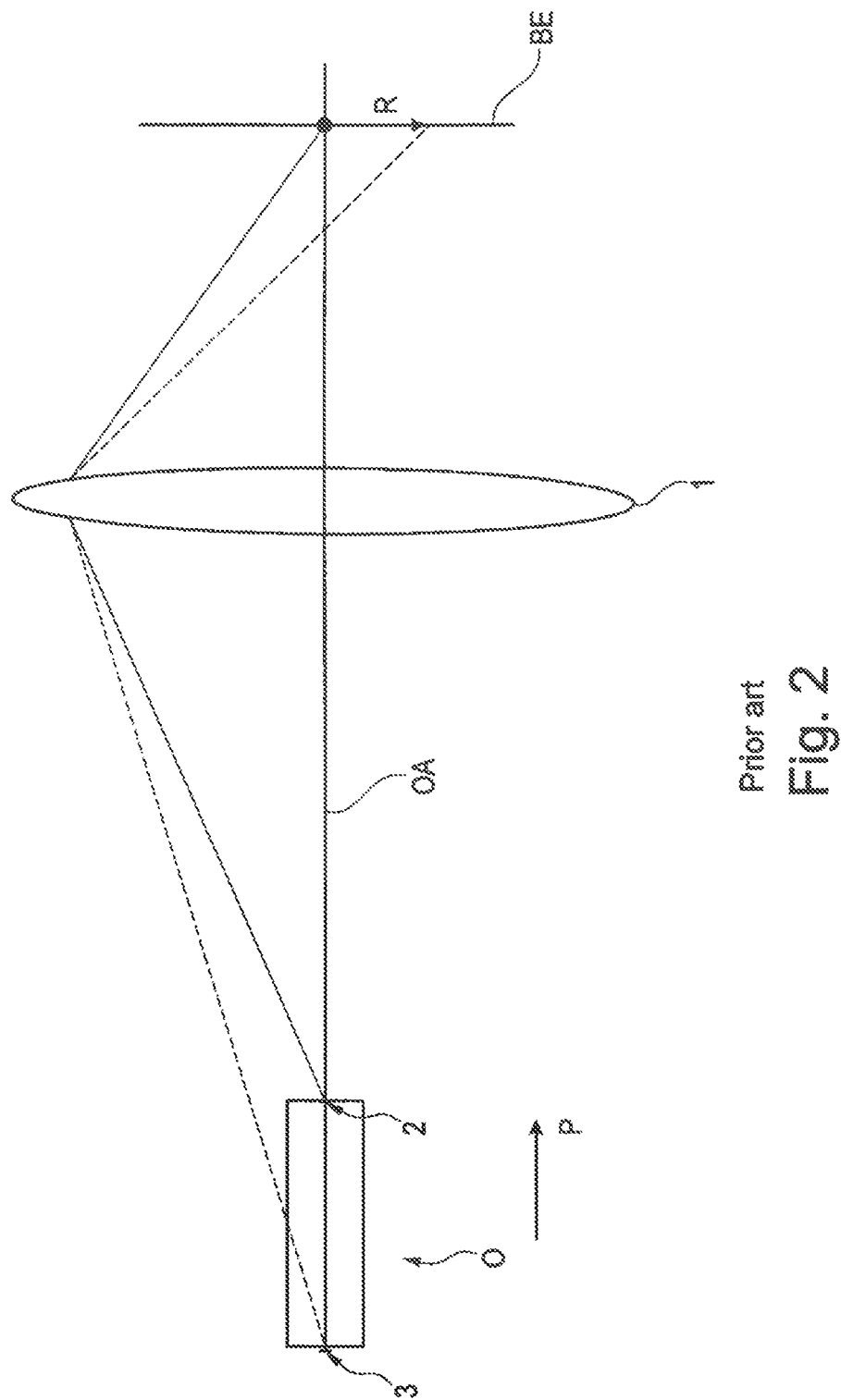
FIG. 2 shows an illustration of a circle of confusion according to the prior art.

Initially, reference is made again to FIG. 1. FIG. 1 shows a schematic illustration of an objective lens 1 of a camera. By way of example, the objective lens 1 has one or more lens elements, which are not illustrated in FIG. 1. Moreover, the objective lens 1 has an aperture unit, which is not illustrated for reasons of clarity in the schematic illustration of FIG. 1. The aperture unit is provided with an adjustable aperture, which has a diameter. For the purposes of focusing the objective lens 1 on an object plane, the lens element or the plurality of lens elements are embodied to be movable along an optical axis OA of the objective lens 1. The object, situated in the object plane, to be imaged with the objective lens 1 is disposed at a recording distance E from the image plane. As already explained above, the relative position and alignment of the depth of field of the objective lens 1 is implemented by calculating a far point distance and a near point distance, wherein the far point distance is the distance between the objective lens 1 and a first plane, which is aligned perpendicular to the optical axis OA of the objective lens 1 and in which a far point is disposed. The near point distance is the distance between the objective lens 1 and a second plane, which is aligned perpendicular to the optical axis of the objective lens 1 and in which a near point is disposed. The near point distance and the far point distance are specified by equations [1] and [2]. Accordingly, the depth of field is a range. For as long as the object is located in the depth of field, it is imaged in focus by the objective lens 1.

Figure 3:
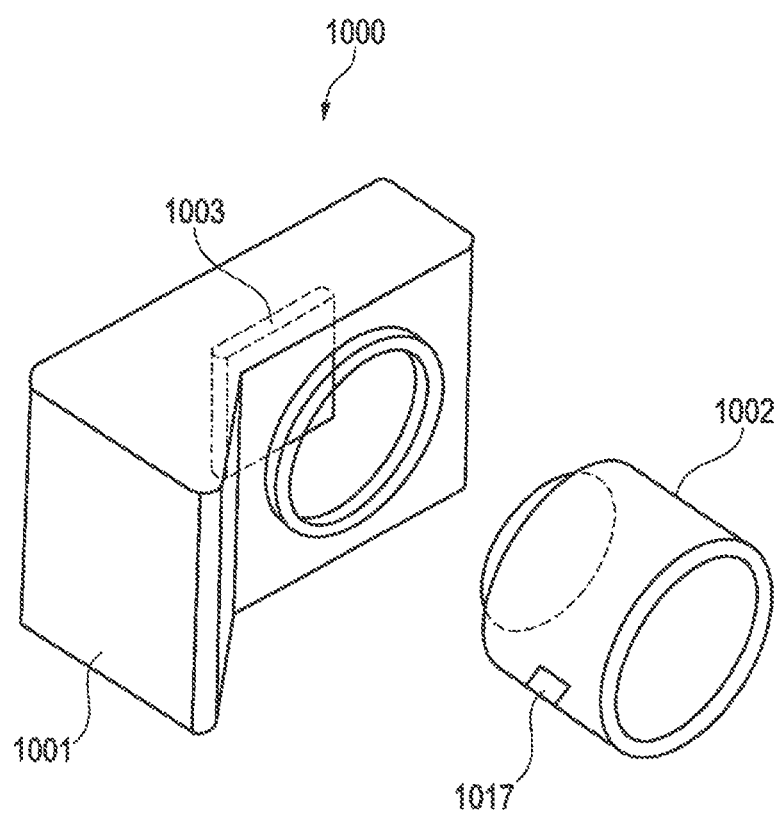
FIG. 3 shows a schematic illustration of a camera.

FIG. 3 shows a schematic illustration of a camera 1000 of a system according to the disclosure. By way of example, the camera 1000 is embodied as a photographic camera or as a film camera. The camera 1000 has a housing 1001, on which an objective lens 1002 is disposed. An image capture unit 1003, which captures images that are imaged by the objective lens 1002, is disposed in the housing 1001. By way of example, the image capture unit 1003 is a digital image capture unit, in particular a CMOS sensor. However, the invention is not restricted to the use of a digital image capture unit. Rather, any image capture unit suitable for the invention can be used as the image capture unit, for example a photographic film. In the embodiment illustrated in FIG. 3, the objective lens 1002 is embodied as an interchangeable objective lens. However, the invention is not restricted to such an objective lens. Rather, an objective lens that is not disposed in detachable fashion on the housing 1001 of the camera 1000 is also suitable for the invention. By way of example, an XD data interface 1017 for connecting a data memory is disposed on the objective lens 1002.

Figure 4:
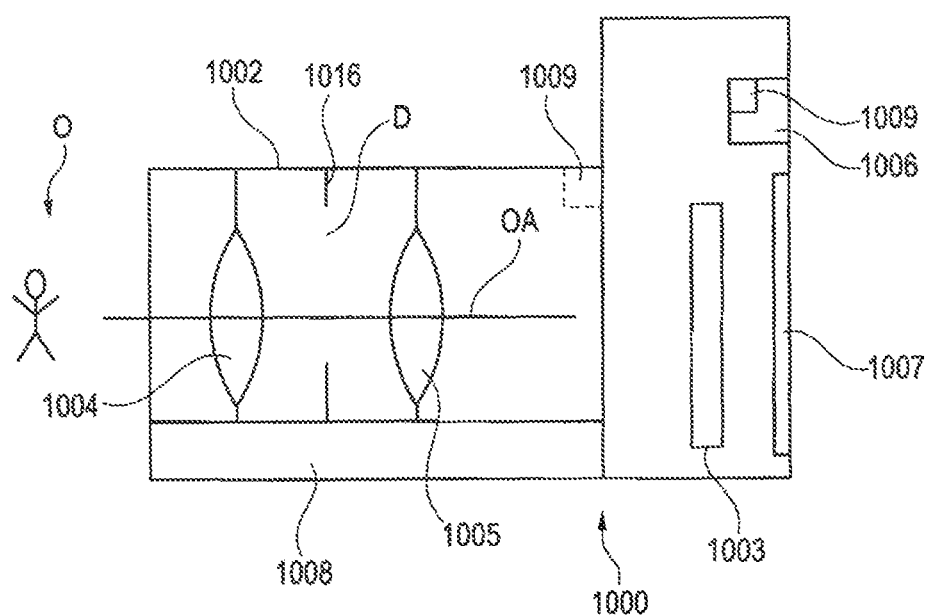
FIG. 4 shows a further schematic illustration of a camera according to FIG. 3.

FIG. 4 shows a further schematic illustration of the camera 1000 according to FIG. 3 in a vertical section. In this embodiment, the objective lens 1002 has a first lens unit 1004 and a second lens unit 1005, which are disposed in succession along an optical axis OA of the objective lens 1002. The objective lens 1002 can have a certain number of individual lens elements, lens groups and/or further optical units, for example in the form of prisms or mirrors. The invention is not restricted to a certain embodiment of an objective lens. Rather, any suitable objective lens can be used in the invention. An aperture unit 1016, which has an adjustable aperture with a diameter D, is disposed between the first lens unit 1004 and the second lens unit 1005.

Further, the camera 1000 has a processor 1006 and a monitor 1007. Further, the image capture unit 1003 is provided on the camera 1000. From the object O to be imaged and in the direction of the image capture unit 1003, the object O is disposed first, followed by the objective lens 1002 and then the image capture unit 1003. Moreover, the camera 1000 and/or the objective lens 1002 has a first SLAM module 1008, the structure, function and mode of operation of which will be explained in more detail below. Further, the camera 1000 is provided with a first communications device 1009. As an alternative thereto, the objective lens 1002 is provided with the first communications device 1009, which is elucidated by the dashed lines in FIG. 4. The first communications device 1009 is embodied as a radio device, which uses a transmission standard or a plurality of transmission standards on a transmission path or a plurality of transmission paths. By way of example, Bluetooth is used as a transmission standard. Further, a wireless local area network, that is, a WLAN, is used for transmission purposes. As already explained above, the invention is not restricted to such an embodiment of the communications device. Rather, the first communications device 1009 can have any form that is suitable for the invention.

Figure 5:
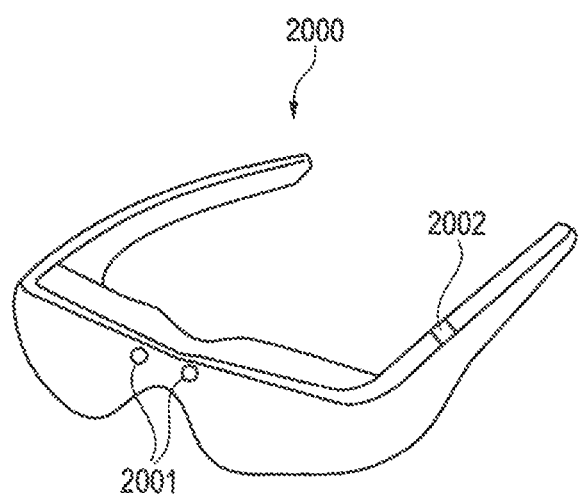
FIG. 5 shows a schematic illustration of an AR display and observation device in the form of a pair of spectacles.

The system also has an AR display and observation device 2000, which is illustrated in FIG. 5. In this embodiment, the AR display and observation device 2000 is embodied as a pair of spectacles, which is worn by a person. By way of example, this person is a focus puller. As already explained above, however, the invention is not restricted to an embodiment of the AR display and observation device 2000 as a pair of spectacles. Rather, the AR display and observation device 2000 can have any form suitable for the invention, for example also the form of a monitor. Moreover, the AR display and observation device 2000 has a second SLAM module 2001, the structure, function and mode of operation of which will be explained in more detail below. Further, the AR display and observation device 2000 is provided with a second communications device 2002. The second communications device 2002 is embodied as a radio device and communicates, for example, with the first communications device 1009, which is disposed on the camera 1000 or the objective lens 1002. By way of example, the second communications device 2002 uses a transmission standard or a plurality of transmission standards on a transmission path or a plurality of transmission paths. By way of example, Bluetooth is used as a transmission standard. Further, a wireless local area network, that is, a WLAN, is used for transmission purposes. As already explained above, the invention is not restricted to such an embodiment of the communications device. Rather, the second communications device 2002 can have any form that is suitable for the invention.

The AR display and observation device 2000 renders it possible to observe objects and, at the same time as when observing these objects, display additional information or virtual objects by means of a superposition into the beam path of the eyes or by means of an overlay of images with this additional information or these virtual objects.

Figure 6:
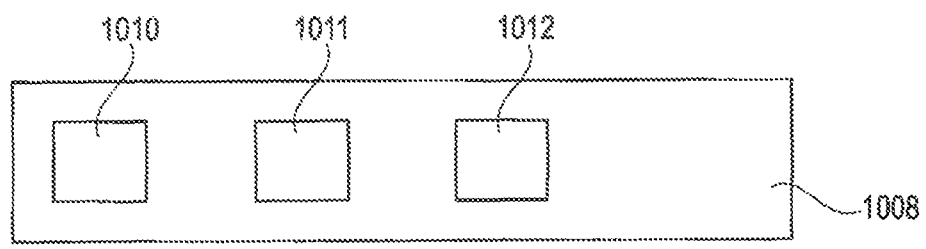
FIG. 6 shows a schematic illustration of a SLAM module of a camera.

FIG. 6 shows a schematic illustration of the first SLAM module 1008, which has a first inertial measurement unit 1010, a first depth camera 1011 and a first surround camera 1012. The first inertial measurement unit 1010 of the first SLAM module 1008 has acceleration sensors and rate sensors which facilitate a detection of a movement of the camera 1000 or of the objective lens 1002 with 6 degrees of freedom, for example. In principle, the first inertial measurement unit 1010 is an inertial navigation system and used to detect the movement and determine the relative position of the camera 1000 or the objective lens 1002 in space.

The first depth camera 1011 of the first SLAM module 1008 is used to determine the distance between the objective lens 1002 and a point in space, that is, a point in the surroundings of the camera 1000. By way of example, the first depth camera 1011 is embodied as a plenoptic imaging unit, as a stereoscopic imaging unit, as a time-of-flight imaging unit (that is, as a TOF imaging unit) and/or as a unit for projecting and capturing a pattern (for example, a fringe projection or a projection of a point cloud). A plenoptic imaging unit, for example a plenoptic camera, is known from the prior art. Using a plenoptic camera, it is not only possible to determine the position and the intensity of a light ray on the image capture unit 1003 but also possible to determine the direction from which the light ray is incident. A stereoscopic imaging unit, for example in the form of a stereoscopic camera, is also known from the prior art. The latter is based on the principle of stereoscopy. Further, a TOF imaging unit, for example in the form of a TOF camera, is also known from the prior art. In the case of the TOF camera, the distance between the object O and the TOF camera is measured using the time-of-flight method. However, reference is made to the fact that the invention is not restricted to the use of the aforementioned imaging units for determining the distances. Rather, use can be made of any suitable method and/or any suitable imaging unit for determining the distances. By way of example, the distances could also be determined using an ultrasonic measurement unit using an ultrasonic measurement method.

The first surround camera 1012 of the first SLAM module 1008 is used to record the surroundings of the camera 1000.

Figure 7:
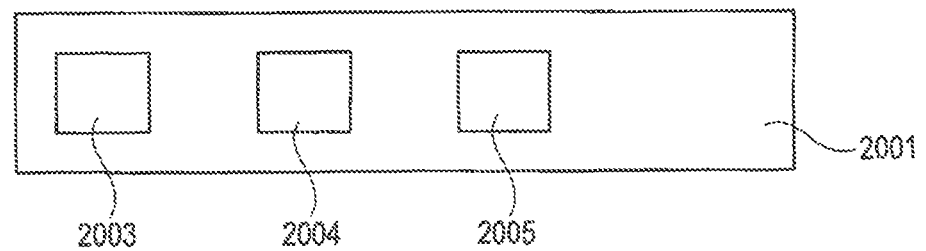
FIG. 7 shows a schematic illustration of a SLAM module of an AR display and observation device.

FIG. 7 shows a schematic illustration of the second SLAM module 2001, which has a second inertial measurement unit 2003, a second depth camera 2004 and a second surround camera 2005.

The second inertial measurement unit 2003 of the second SLAM module 2001 has acceleration sensors and rate sensors which facilitate a detection of a movement of the AR display and observation device 2000 with 6 degrees of freedom, for example. In principle, the second inertial measurement unit 2003 is an inertial navigation system and is used to detect the movement and determine the relative position of the AR display and observation device 2000 in space.

The second depth camera 2004 of the second SLAM module 2001 is used to determine the distance between the AR display and observation device 2000 and a point in space, that is, a point in the surroundings of the AR display and observation device 2000. By way of example, the second depth camera 2004 is embodied as a plenoptic imaging unit, as a stereoscopic imaging unit, as a time-of-flight imaging unit (that is, as a TOF imaging unit) and/or as a unit for projecting and capturing a pattern (for example, a fringe projection or a projection of a point cloud). The statements already made above apply accordingly in respect of the aforementioned imaging units.

The second surround camera 2005 of the second SLAM module 2001 is used to record the surroundings of the AR display and observation device 2000.

Figure 8A:
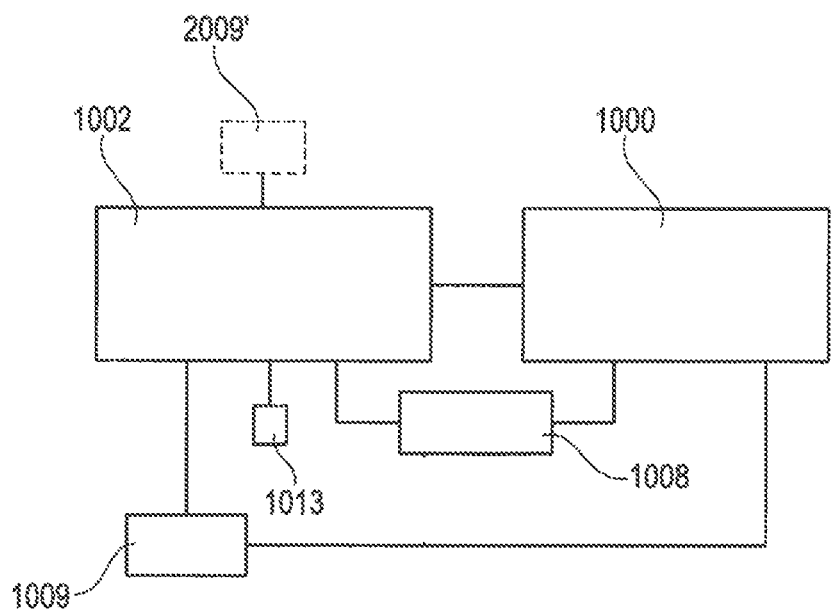
FIG. 8A shows a block diagram of a first embodiment of a system for setting and visualizing parameters for focusing an objective lens of a camera on an object.
Figure 8A:
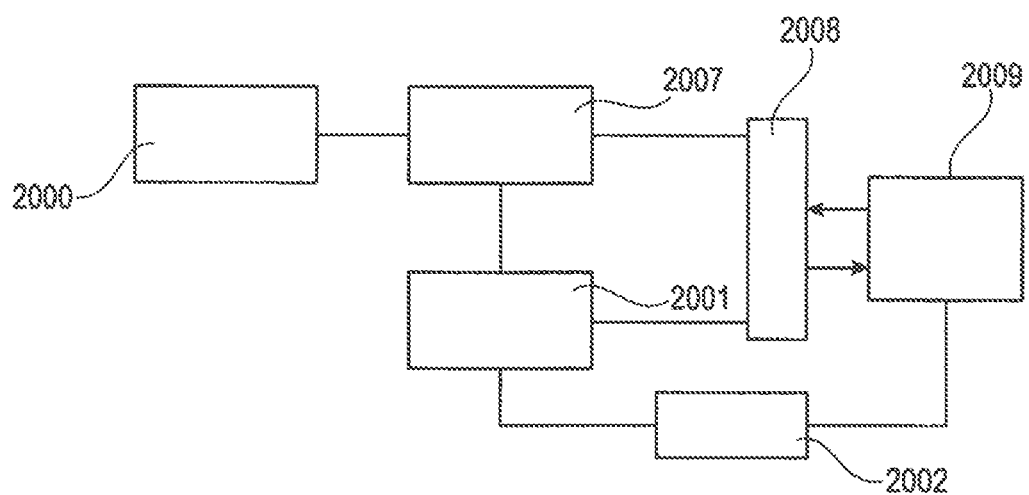
Figure 8B:
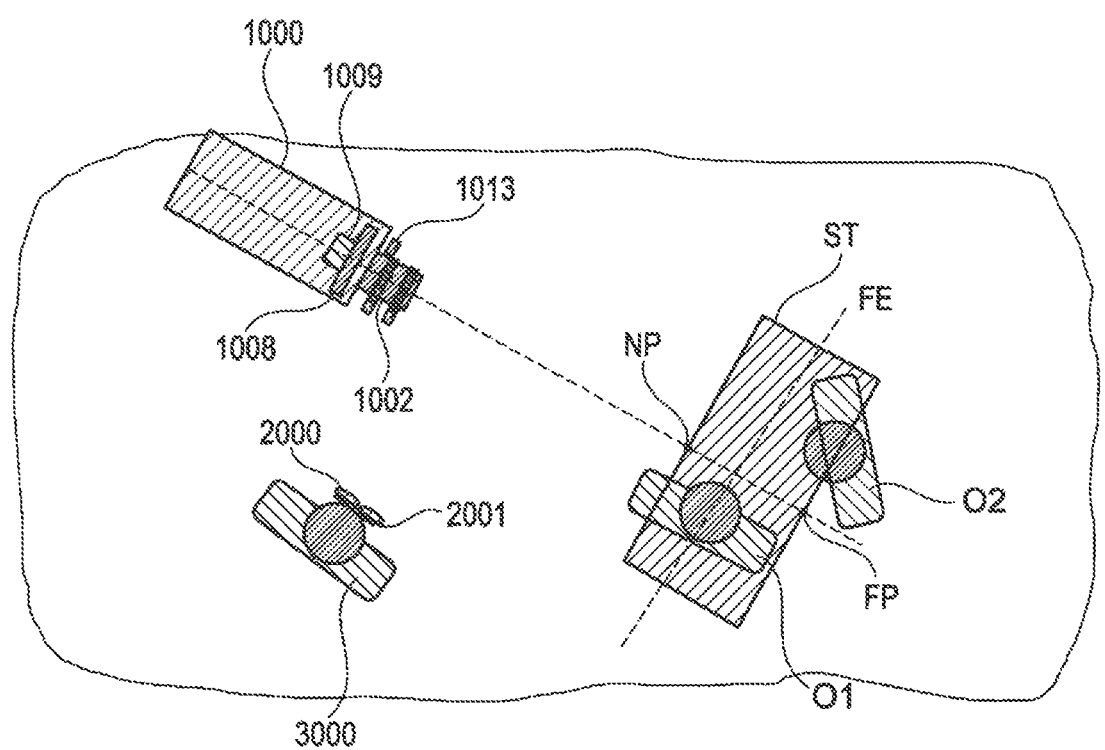
FIG. 8B shows a schematic illustration of the first embodiment of the system according to FIG. 8A.

FIGS. 8A and 8B show a first exemplary embodiment of a system for setting and visualizing parameters for focusing an objective lens of a camera on an object. FIG. 8A shows a block diagram of the first embodiment of the system. FIG. 8B shows a schematic illustration of the first embodiment of the system, wherein FIG. 8B does not illustrate all units shown in FIG. 8A for reasons of clarity.

The system according to the first embodiment has the camera 1000 with the objective lens 1002. Further, the first SLAM module 1008 is disposed in line-connected fashion on the camera 1000 and on the objective lens 1002. Further, the first communications device 1009 is provided, which is disposed in line-connected fashion on the objective lens 1002 and on the camera 1000. In a further embodiment, provision is made for the first communications device 1009 to be disposed on the objective lens 1002 only. In yet a further embodiment, provision is made for the first communications device 1009 to be disposed in a separate box that is separated from the objective lens 1002.

The objective lens 1002 is provided with a data memory in the form of a memory unit 1013. All data of the objective lens 1002 are stored in the memory unit 1013, in particular the focal length f of the objective lens 1002, the f-number k of the objective lens 1002, the diameter D of the aperture, the recording distance E between the image plane and the object plane, on which focusing is carried out, information about the near point distance NF and the far point distance FF and information relating to the imaging properties of the objective lens 1002, in particular imaging aberrations. The data stored in the memory unit 1013 can be partly or completely loaded into the processor 1006 for further processing.

The system according to the first embodiment moreover has the AR display and observation device 2000, which is embodied as a pair of spectacles and worn by a person 3000. By way of example, the person 3000 is a focus puller. The AR display and observation device 2000 has an image processor 2007 or is line-connected to the image processor 2007. Further, the AR display and observation device 2000 is provided with the second SLAM module 2001, which is line-connected to the image processor 2007 in the first embodiment. A coordinate transformation unit 2008 is line-connected to the image processor 2007 and the second SLAM module 2001. The coordinate transformation unit 2008 is line-connected to a calculation unit 2009 for bidirectional data interchange. The aforementioned second communications unit 2002 is line-connected to the second SLAM module 2001 and the calculation unit 2009. As an alternative thereto, a calculation unit 2009' is disposed on the objective lens 1002. In yet another alternative thereto, the calculation unit 2009' is spatially separated from the AR display and observation device 2000, the camera 1000 and the objective lens 1002.

A first object O1 in the form of a person and a second object O2 in the form of a further person are imaged with the camera 1000. The first object O1 and the second object O2 are partly within the depth of field ST of the camera 1000.

Figure 9A:
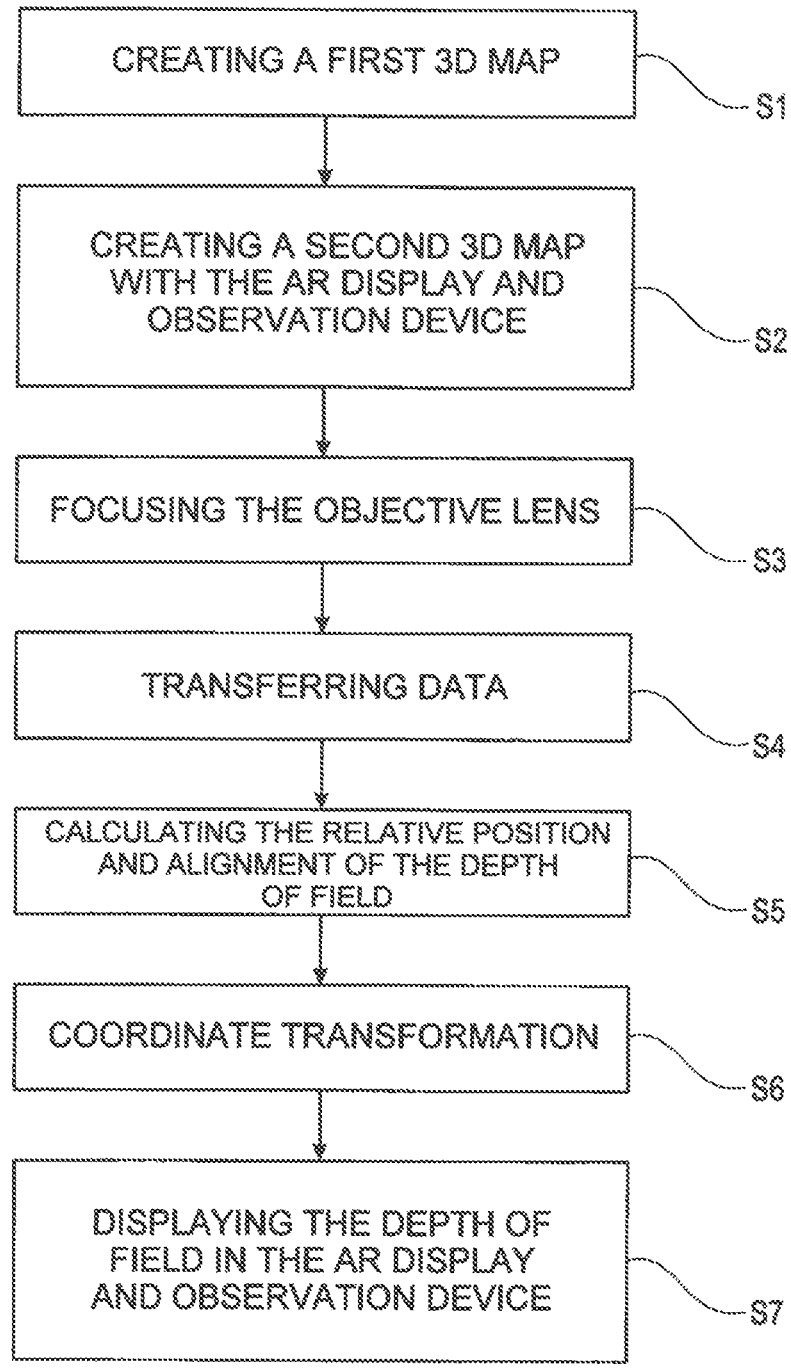
FIG. 9A shows a first embodiment of a method for setting and visualizing parameters for focusing an objective lens of a camera on an object.

A first embodiment of the method is now explained on the basis of a flow chart, which is illustrated in FIG. 9A. The first embodiment of the method as per FIG. 9A is performed using the first system, which is illustrated in FIGS. 8A and 8B. The processor 1006 of the camera 1000 has a computer program product which controls the embodiment of the system in FIGS. 8A and 8B in such a way that the first embodiment of the method is carried out. The computer program product is partly or completely loaded into the processor 1006.

Maps of the surroundings are created using the camera 1000, more precisely using the first SLAM module 1008, and the AR display and observation device 2000. This will be explained below.

Thus, a first 3D map is created in method step S1 by recording surroundings of the camera 1000 with the camera 1000. More specifically, the first SLAM module 1008 disposed on the camera 1000 is used to create the first 3D map in this embodiment. The camera 1000, and hence also the first SLAM module 1008, are panned through space in such a way that the first SLAM module 1008 captures each point in space or at least some of the points in space. Simultaneous localization and mapping is performed by means of the first SLAM module 1008. During this simultaneous localization and mapping, the first 3D map of the surroundings of the camera 1000 and a pose of the camera 1000 in the first 3D map, that is, a first relative spatial position of the camera 1000 in the first 3D map, are created by means of the first SLAM module 1008. The first inertial measurement unit 1010 is used to detect the movement of the first SLAM module 1008, and hence of the camera 1000, for the purposes of creating the first 3D map. The first depth camera 1011 ascertains the distances of each captured point in space from the first SLAM module 1008 and hence also from the camera 1000. The first surround camera 1012 is used to record the surroundings of the camera 1000. Further, the first relative spatial position of the camera 1000 in the first 3D map is determined in the embodiment of the method.

A second 3D map is created in method step S2 by recording surroundings of the AR display and observation device 2000 with the AR display and observation device 2000. More specifically, the second SLAM module 2001 disposed on the AR display and observation device 2000 is used to create the second 3D map in this embodiment. The AR display and observation device 2000, and hence also the second SLAM module 2001, are panned through space in such a way that the second SLAM module 2001 captures each point in space or at least some of the points in space. Simultaneous localization and mapping is performed by means of the second SLAM module 2001. During this simultaneous localization and mapping, the second 3D map of the surroundings of the AR display and observation device 2000 and a pose of the AR display and observation device 2000 in the second 3D map, that is, a second relative spatial position of the AR display and observation device 2000 in the second 3D map, is created by means of the second SLAM module 2001. The second inertial measurement unit 2003 is used to detect the movement of the second SLAM module 2001, and hence of the AR display and observation device 2000, for the purposes of creating the second 3D map. The second depth camera 2004 ascertains the distances of each captured point in space from the second SLAM module 2001 and hence also from the AR display and observation device 2000. The second surround camera 2005 is used to record the surroundings of the AR display and observation device 2000. Further, the second relative spatial position of the AR display and observation device 2000 in the second 3D map is also determined in this embodiment of the method.

The objective lens 1002 of the camera 1000 is focused onto the first object O1 and/or the second object O2 in a method step S3. By way of example, this is implemented by virtue of the person 3000 in the form of the focus puller operating an adjustment mechanism for adjusting the position of the first lens unit 1004 and/or the second lens unit 1005 of the objective lens 1002 along the optical axis OA of the objective lens 1002 in manual fashion or in motor-driven fashion with a remote control. Consequently, the first lens unit 1004 and/or the second lens unit 1005 of the objective lens 1002 is/are moved along the optical axis OA of the objective lens 1002. The depth of field ST of the objective lens 1002 is set following the focusing of the objective lens 1002.

In a method step S4, there now is a transfer of data of the camera 1000 and of the objective lens 1002 via the first communications device 1009 to the second communications device 2002 of the AR display and observation device 2000. The first communications device 1009 is embodied as a radio device, which uses a plurality of transmission standards and a plurality of transmission paths. In the embodiment illustrated here, objective lens metadata are transferred from the first communications device 1009 to the second communications device 2002 using the Bluetooth transmission standard. By contrast, information in respect of the first relative spatial position of the camera 1000 is transferred from the first communications device 1009 to the second communications device 2002 via WLAN. The objective lens metadata comprise, in particular, (i) the recording distance E, that is, the distance between the image plane of the objective lens 1002 and the object O1, O2, (ii) the focal length of the objective lens 1002, (iii) a measure for the aperture of the aperture unit of the objective lens 1002, for example the f-number of the objective lens 1002, (iv) the radius of the circle of confusion, (v) the manufacturer of the objective lens 1002, (vi) the name and/or the designation of the objective lens 1002, (vii) a structural design of the objective lens 1002—expressed differently, information items about the optical structure in the form of the employed optical units and/or about the electronic structure of the objective lens 1002—and (viii) a structural configuration of an image capture unit of the camera 1000—expressed differently, information items about the structure of the image capture unit, in particular about the size of the image capture unit.

In a method step S5, the relative position and the alignment of the depth of field ST of the objective lens 1002 are now calculated in the 3D space using the following parameters: the recording distance E between the image plane of the objective lens 1002 and the first object O1 and/or the second object O2, the focal length f of the objective lens 1002, the f-number k of the objective lens 1002 and the radius of the circle of confusion. Expressed differently, the relative position and the alignment of the depth of field ST of the objective lens 1002 are determined with the set and available parameters. The calculation of the relative position and the alignment of the depth of field ST of the objective lens 1002 is implemented in the calculation unit 2009 of the AR display and observation device 2000. As an alternative thereto, the calculation of the relative position and the alignment of the depth of field ST of the objective lens 1002 is implemented in the calculation unit 2009', which was explained above. By way of example, the calculation of the relative position and the alignment of the depth of field ST of the objective lens 1002 is implemented by calculating the near focus distance NF and the far focus distance FF on the basis of the aforementioned formulae [1] and [2], where the depth of field ST of the objective lens 1002 is bounded both by the near focus distance NF and by the far focus distance FF.

In a further method step S6, there now is a coordinate transformation of the calculated relative position and alignment of the depth of field ST from the first coordinate system of the camera 1000 to the second coordinate system of the AR display and observation device 2000. Coordinate transformations between two coordinate systems have already been known for a long time and are therefore not explained in any more detail here.

Further, the relative position and the alignment of the depth of field ST of the objective lens 1002 is displayed as an image in the AR display and observation device 2000 in method step S7. The person 3000 in the form of the focus puller can then observe the object O1 and/or the object O2 with the AR display and observation device 2000. At the same time, the relative position and the alignment of the depth of field ST of the objective lens 1002 is displayed. Accordingly, the person 3000 can check whether the object O1 and/or the object O2 is situated completely, partly or not at all in the depth of field ST of the objective lens 1002.

By way of example, the depth of field ST is displayed in the AR display and observation device 2000 by displaying the focal plane FE, the near point NP and the far point FP. In a further embodiment, provision is made for the depth of field ST to be visualized as a body with four corners and at least two parallel surfaces, for example as a cuboid object or as a pyramid frustum, and to be displayed as an image in the AR display and observation device 2000. By way of example, the body has a front side and a back side. The focal plane FE is aligned both parallel to the front side and to the back side and disposed between the front side and the back side. By way of example, the front side is embodied as the plane which is aligned perpendicular to the optical axis OA of the objective lens 1002 and in which the near point is disposed. Moreover, the back side is embodied as the plane which is aligned perpendicular to the optical axis OA of the objective lens 1002 and in which the far point is disposed. In yet a further embodiment, the focal plane FE is embodied as the front side or as the back side of the body. In a further embodiment, the normal vector of the focal plane FE is aligned parallel or antiparallel to the optical axis OA of the objective lens 1002. In yet a further embodiment, the normal vector of the front side and the back side of the body is aligned parallel or antiparallel to the optical axis OA of the objective lens 1002.

Additionally, the recording distance E can be displayed in the AR display and observation device 2000 in all embodiments.

In a further embodiment, provision is made for the depth of field ST to be displayed in the AR display and observation device 2000 as a pyramidal frustum. Additionally, provision is made in this embodiment for, for example, a marking to be overlaid in the image of the AR display and observation device 2000, on the optical axis OA in the focal plane FE. For the purposes of calculating the relative position and alignment of the pyramid frustum, the calculation unit 2009 uses, for example, the coordinates of a point on the optical axis OA of the objective lens 1002 in the focal plane FE, the coordinates of the near point NP on the optical axis OA, the coordinates of the far point FP on the optical axis OA, the horizontal aperture angle of the objective lens 1002 and the ratio between the horizontal and vertical image size. For the purposes of calculating the pyramid frustum, a table is stored in the calculation unit 2009, the table being used to calculate the vertical aperture angle on the basis of the horizontal aperture angle. Further, it is possible to take account of the influence on the image angle of a possible adapter between the camera 1000 and the objective lens 1002.

Figure 9B:
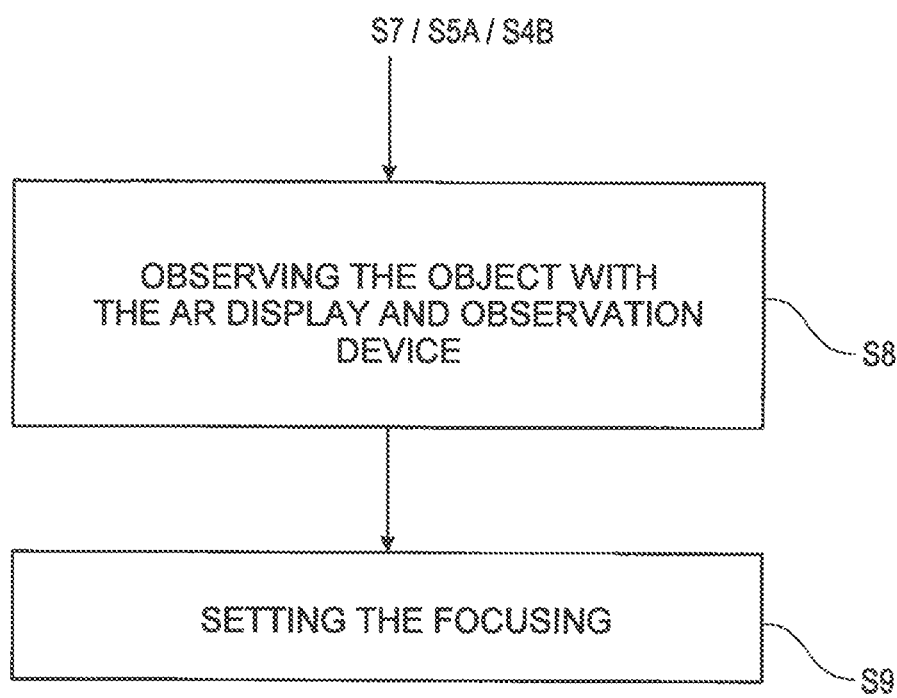
FIG. 9B shows a development of the first embodiment of the method according to FIG. 9A.

FIG. 9B shows method steps that can be carried out in a further embodiment of the method according to FIG. 9A. In this further embodiment, method step S7 is followed by method step S8, in which the first object O1 to be imaged by the objective lens 1002 of the camera 1000 and/or the second object O2 to be imaged by the objective lens 1002 of the camera 1000 is/are observed with the AR display and observation device 2000. In method step S9, there is renewed focusing of the objective lens 1002 on the first object O1 and/or second object O2 to be imaged by the objective lens 1002 if the first object O1 observed by the AR display and observation device 2000 and/or the second object O2 observed by the AR display and observation device 2000 and the image of the relative position and the alignment of the depth of field ST of the objective lens 1002 displayed in the AR display and observation device 2000 no longer sufficiently overlap according to the imagination of the person 3000 in the form of the focus puller. Expressed differently, the objective lens 1002 is refocused on the first object O1 to be imaged by the objective lens 1002 and/or the second object O2 to be imaged by the objective lens 1002 should the first object O1 and/or the second object O2 move out of the depth of field ST.

In a further embodiment of the method as per FIG. 9A, the method as per FIG. 9A is run through again, starting with method step S1 following method step S7. In this further embodiment of the method, the created first 3D map is supplemented by the renewed recording of the surroundings with the first SLAM module 1008 of the camera 1000 or of the objective lens 1002. Further, the second 3D map is supplemented by renewed recording of the surroundings with the second SLAM module 2001 of the AR display and observation device 2000. Expressed differently, changes in the surroundings of the camera 1000 and/or AR display and observation device 2000 are included in the respective 3D map. This is also referred to as continuous SLAM. Expressed yet again differently, continuous SLAM is performed both with the camera 1000 or the objective lens 1002 and with the AR display and observation device 2000.

In yet a further embodiment of the method as per FIG. 9B, the method as per FIG. 9B is run through again, starting with method step S1 following method step S9. The explanations provided above likewise apply in that case.

In a yet further embodiment of the method, provision is additionally or alternatively made in method step S3 for a point to be set in a desired depth of field ST, to be precise by (i) observing the point with the AR display and observation device 2000 and determining the position of the point, and/or by (ii) marking the point by means of a manual unit. By way of example, the manual unit is embodied as a measurement system with 6 degrees of freedom, which has a button. The point is set by pressing the button. By way of example, a virtual target marker is overlaid in the AR display and observation device 2000 in a manner fitting to the movement of the manual unit. The point is set by pressing the button when the point is covered by the virtual target marker. In addition or as an alternative thereto, the virtual target marker can also be moved by way of the movement of the AR display and observation device 2000. In a further addition or as a further alternative thereto, for example, an eye tracker, which identifies the eye movement of a user of the AR display and observation device 2000, can be used to move the target marker. The invention is not restricted to such a configuration of the manual unit. Rather, any manual unit suitable for the invention can be used as manual unit. The recording distance E is determined on the basis of the distance of the point from the objective lens 1002 and is displayed in the AR display and observation device 2000, for example. This is followed by manual or motor-controlled focusing of the objective lens 1002 using the determined recording distance E. In a further embodiment of the method, provision is made for a plurality of points to be selected as described above and for the recording distance E to be determined and displayed in the AR display and observation device 2000 for each of the plurality of points. This makes it easier for the person 3000 in the form of the focus puller to focus the objective lens 1002 as desired, for example when recording a film scene.

Figure 9C:
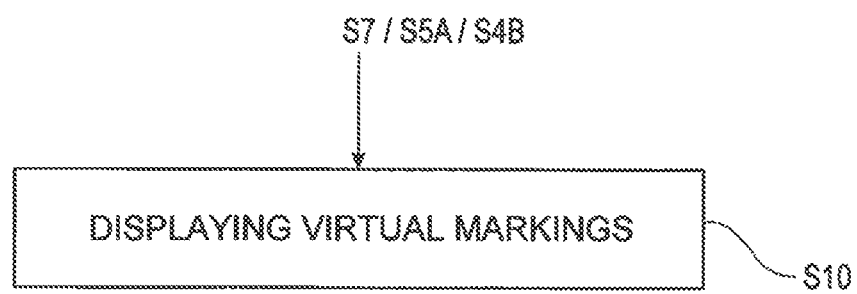
FIG. 9C shows a further development of the first embodiment of the method according to FIG. 9A.

In a further embodiment of the method as per FIG. 9A, provision is made for virtual markings to be displayed in the AR display and observation device 2000 in a method step S10 as per FIG. 9C, which follows method step S7, wherein the object O1 and/or the object O2, for example, moves/move along these virtual markings. The virtual markings help the person 3000 in the form of the focus puller better set the depth of field ST, which has to be repeatedly set anew on account of the movement, and better estimate the situation of the recording, that is, the imaging of the object O1 and/or the object O2. The virtual markings can take any form, for example they can be embodied as points or arrows. By way of example, the virtual markings may have been programmed before the imaging of the object O1 or the object O2 and/or are calculated by a computer from movements, which are assembled from empirical values, for example, and/or on the basis of physical laws. However, the virtual markings could also represent objects that are subsequently worked into the recording by special effects. This also aids the person 3000 in the form of the focus puller with being able to better estimate the situation of the recording, that is, the imaging of the object O1 or the object O2.

In yet another embodiment of the method as per FIG. 9A, provision is made for imaging properties of the objective lens 1002 to also be loaded from the memory unit 1013 into the calculation unit 2009 by means of the first communications device 1009 and the second communications device 2002 when transferring data in method step S4. Further, the object O1 and/or the object O2 is observed with the AR display and observation device 2000 using the imaging properties of the objective lens 1002. In this embodiment, provision is made for typical properties of the objective lens 1002, in particular image angles and/or aberrations, to be loaded from the memory unit 1013, which may be programmed as an app, for example. The AR display and observation device 2000 now emulates a virtual objective lens and displays an image of the object O1 and/or of the object O2, as would be produced with the imaging properties of the objective lens 1002.

In yet a further embodiment of the method as per FIG. 9A, provision is made in method step S3 for a point in the 3D space to be selected by the first SLAM module 1008 of the camera 1000 or of the objective lens 1002. By way of example, this point is disposed in the focal plane FE. The point and its associated local coordinate system are described, and recorded, as accurately as possible on account of characteristic features of the 3D space. Any feature can be used as a characteristic feature. By way of example, markings or peculiarities on furniture or further objects can be used as characteristic features. The characteristic features are transferred from the first SLAM module 1008 of the camera 1000 or of the objective lens 1002 to the second SLAM module 2001 of the AR display and observation device 2000 and stored in a data memory of the second SLAM module 2001 and, where necessary, processed further by the second SLAM module 2001. If the second SLAM module 2001 now identifies the features that are characteristic for the point and the local coordinate system, then the second SLAM module 2001 can calculate the position and the relative position of the point and of the local coordinate system in the second coordinate system of the AR display and observation device 2000, which substantially corresponds to the coordinate system of the second SLAM module 2001. Additionally or alternatively, provision is made for a point set by the second SLAM module 2001, for example a so-called anchor point, to be transferred from the second SLAM module 2001 to the first SLAM module 1008. It is advantageous in the aforementioned embodiment that the first SLAM module 1008 is able to determine the relative position of the second SLAM module 2001 and the second SLAM module 2001 is able to determine the relative position of the first SLAM module 1008.

Figure 10A:
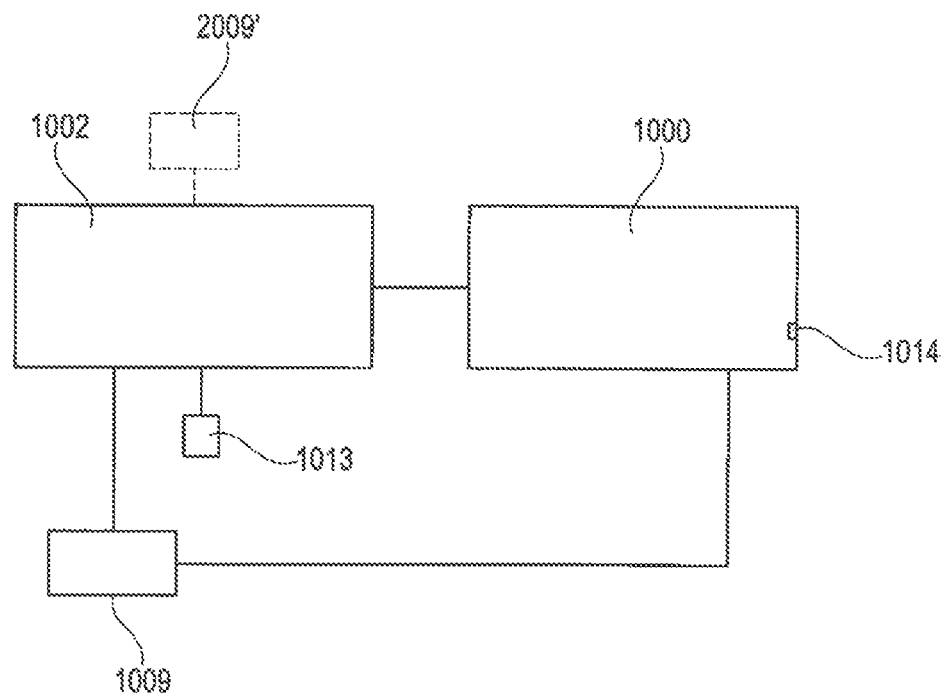
FIG. 10A shows a block diagram of a second embodiment of a system for setting and visualizing parameters for focusing an objective lens of a camera on an object.
Figure 10A:
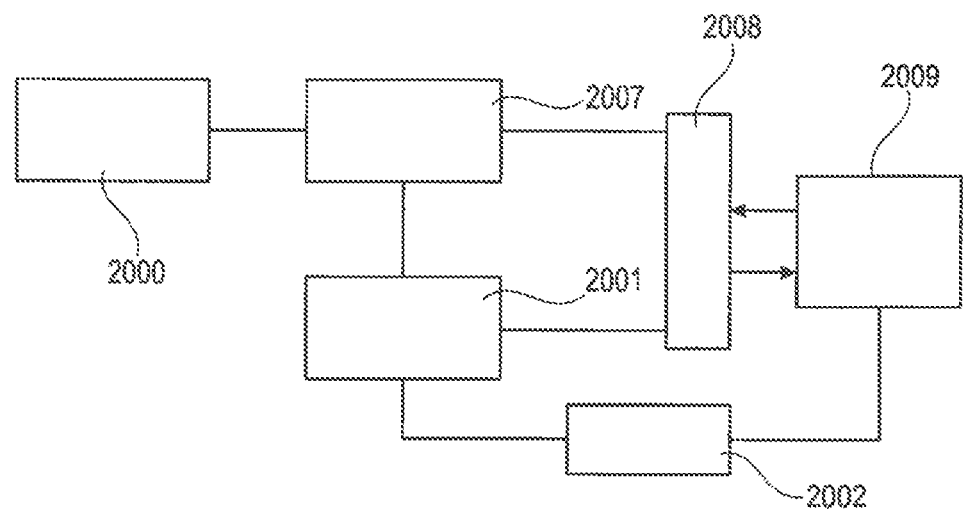
Figure 10B:
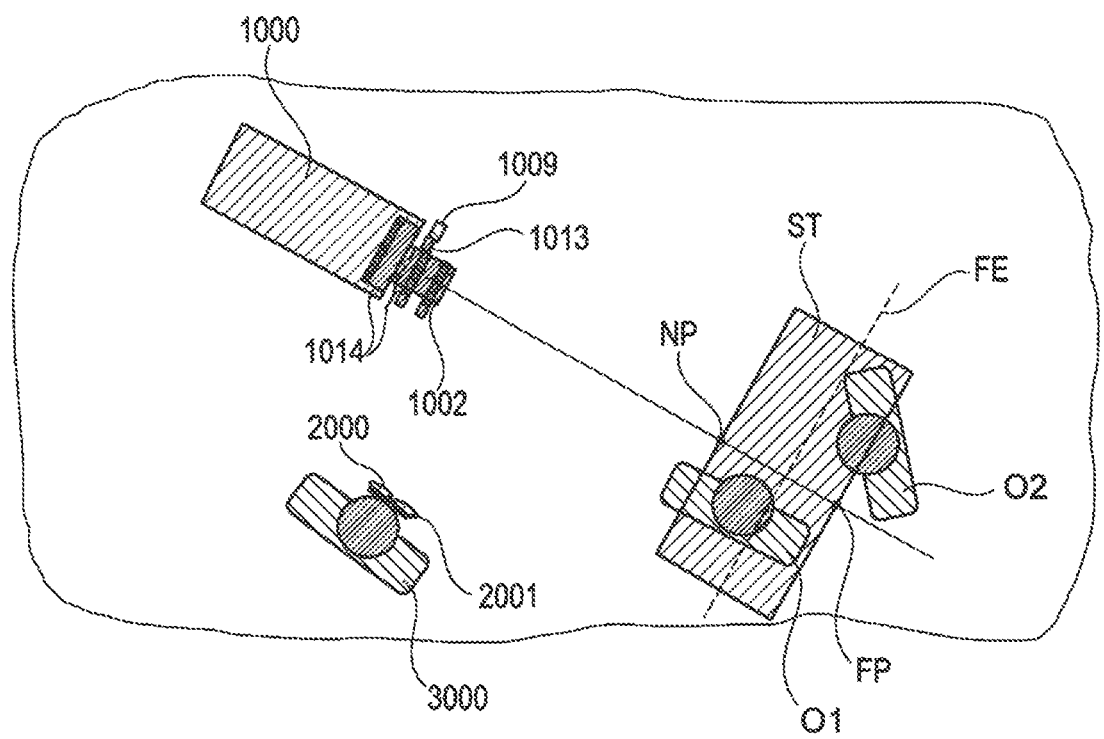
FIG. 10B shows a schematic illustration of the second embodiment of the system according to FIG. 10A.

FIGS. 10A and 10B show a second embodiment of a system for setting and visualizing parameters for focusing an objective lens of a camera on an object. The system according to the second embodiment, which is illustrated in FIGS. 10A and 10B, is based on the first embodiment as per FIGS. 8A and 8B. Identical component parts are provided with identical reference signs. Therefore, reference is made to the explanations provided above, which also apply in this case. In contrast to the first embodiment as per FIGS. 8A and 8B, the second embodiment as per FIGS. 10A and 10B has no first SLAM module on the camera 1000, but a marking 1014. As an alternative thereto, the marking is disposed on the objective lens 1002, which is indicated by the dashed lines in FIG. 10B.

Figure 11:
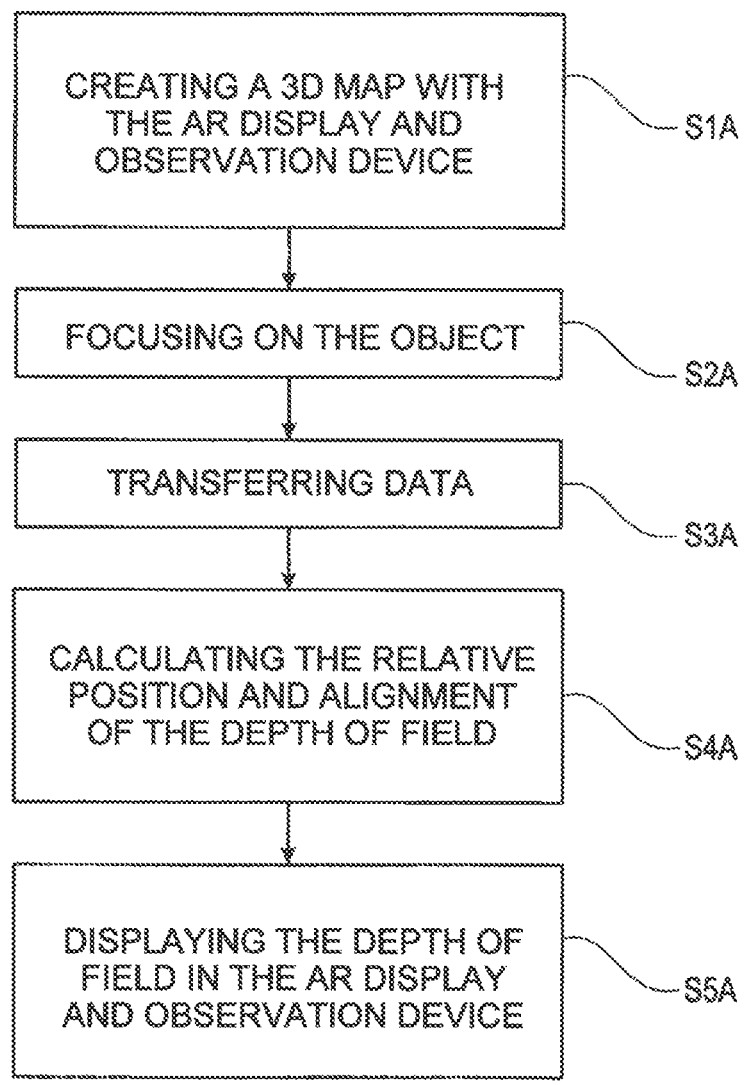
FIG. 11 shows a second embodiment of a method for setting and visualizing parameters for focusing an objective lens of a camera on an object.

A second exemplary embodiment of the method is now explained on the basis of a flow chart, which is illustrated in FIG. 11. The second embodiment of the method as per FIG. 11 is performed using the second embodiment of the system, which is illustrated in FIGS. 10A and 10B. The processor 1006 of the camera 1000 has a computer program product which controls the second embodiment of the system in FIGS. 10A and 10B in such a way that the second embodiment of the method is carried out. The computer program product is partly or completely loaded into the processor 1006.

A 3D map is created in method step S1A by recording surroundings of the AR display and observation device 2000 with the AR display and observation device 2000. More specifically, the second SLAM module 2001 disposed on the AR display and observation device 2000 is used to create the 3D map in this embodiment. The AR display and observation device 2000, and hence also the second SLAM module 2001, are panned through space in such a way that the second SLAM module 2001 captures each point in space or at least some of the points in space. Simultaneous localization and mapping is performed by means of the second SLAM module 2001. During this simultaneous localization and mapping, the 3D map of the surroundings of the AR display and observation device 2000 and a pose of the AR display and observation device 2000 in the 3D map, that is, a relative spatial position of the AR display and observation device 2000 in the 3D map, is created by means of the second SLAM module 2001. The second inertial measurement unit 2003 is used to detect the movement of the second SLAM module 2001, and hence of the AR display and observation device 2000, for the purposes of creating the 3D map. The second depth camera 2004 ascertains the distances of each captured point in space from the second SLAM module 2001 and hence also from the AR display and observation device 2000. The second surround camera 2005 is used to record the surroundings of the AR display and observation device 2000. Further, the relative spatial position of the AR display and observation device 2000 in the 3D map and the relative spatial position of the camera 1000 in the 3D map are determined in this embodiment of the method.

The objective lens 1002 of the camera 1000 is focused onto the first object O1 and/or the second object O2 in a method step S2A. By way of example, this is implemented by virtue of the person 3000 in the form of the focus puller operating an adjustment mechanism for adjusting the position of the first lens unit 1004 and/or the second lens unit 1005 of the objective lens 1002 along the optical axis OA of the objective lens 1002 in manual fashion or in motor-driven fashion with a remote control. Consequently, the first lens unit 1004 and/or the second lens unit 1005 of the objective lens 1002 is/are moved along the optical axis OA of the objective lens 1002. The depth of field ST of the objective lens 1002 is set following the focusing of the objective lens 1002.

In a method step S3A, there now is a transfer of data of the camera 1000 and of the objective lens 1002 via the first communications device 1009 to the second communications device 2002 of the AR display and observation device 2000. The first communications device 1009 is embodied as a radio device, which can use a plurality of transmission standards and a plurality of transmission paths. In the embodiment illustrated here, objective lens metadata are transferred from the first communications device 1009 to the second communications device 2002 using the Bluetooth transmission standard. The objective lens metadata comprise, in particular, (i) the recording distance E, that is, the distance between the image plane of the objective lens 1002 and the object O1, O2, (ii) the focal length of the objective lens 1002, (iii) a measure for the aperture of the aperture unit of the objective lens 1022, for example the f-number of the objective lens 1002, (iv) the radius of the circle of confusion, (v) the manufacturer of the objective lens 1002, (vi) the name and/or the designation of the objective lens 1002, (vii) a structural design of the objective lens 1002—expressed differently, information items about the optical structure in the form of the employed optical units and/or about the electronic structure of the objective lens 1002—and (viii) a structural configuration of an image recording unit of the camera 1000—expressed differently, information items about the structure of the image capture unit, in particular about the size of the image capture unit.

In a method step S4A, the relative position and the alignment of the depth of field ST of the objective lens 1002 are now calculated in the 3D space using the following parameters: the recording distance E between the image plane of the objective lens 1002 and the first object O1 and/or the second object O2, the focal length f of the objective lens 1002, the f-number k of the objective lens 1002, the radius of the circle of confusion and the coordinates of the position defined by the marking 1014, wherein the marking 1014 is disposed or can be disposed on the camera 1000 or on the objective lens 1002. Expressed differently, the relative position and the alignment of the depth of field ST of the objective lens 1002 are determined with the set and available parameters. The calculation of the relative position and the alignment of the depth of field ST of the objective lens 1002 is implemented in the calculation unit 2009 of the AR display and observation device 2000. As an alternative thereto, the calculation of the relative position and the alignment of the depth of field ST of the objective lens 1002 is implemented in the calculation unit 2009', which was explained above. By way of example, the calculation of the relative position and the alignment of the depth of field ST of the objective lens 1002 is implemented by calculating the near focus distance NF and the far focus distance FF on the basis of the aforementioned formulae [1] and [2], where the depth of field ST of the objective lens 1002 is bounded both by the near focus distance NF and by the far focus distance FF.

Further, the relative position and the alignment of the depth of field ST of the objective lens 1002 is displayed as an image in the AR display and observation device 2000 in method step S5A. The person 3000 in the form of the focus puller can then observe the object O1 and/or the object O2 with the AR display and observation device 2000. At the same time, the relative position and the alignment of the depth of field ST of the objective lens 1002 is displayed. Accordingly, the person 3000 in the form of the focus puller can check whether the object O1 and/or the object O2 is situated partly, completely or not at all in the depth of field ST of the objective lens 1002.

The depth of field ST is displayed in the AR display and observation device 2000, for example as already explained in respect of the first embodiment of the method as per FIG. 9A. Therefore, reference is made to the explanations given above, which also apply in respect of the embodiment of the method as per FIG. 11.

FIG. 9B shows method steps that can be carried out in a further embodiment of the method according to FIG. 11. In this further embodiment, method step S5A is followed by method step S8, in which the first object O1 to be imaged by the objective lens 1002 of the camera 1000 and/or the second object O2 to be imaged by the objective lens 1002 of the camera 1000 is/are observed with the AR display and observation device 2000. In method step S9, there is renewed focusing of the objective lens 1002 on the first object O1 to be imaged by the objective lens 1002 and/or on the second object O2 to be imaged by the objective lens 1002 if the first object O1 observed by the AR display and observation device 2000 and/or the second object O2 observed by the AR display and observation device 2000 and the image of the relative position and the alignment of the depth of field ST of the objective lens 1002 displayed in the AR display and observation device 2000 no longer sufficiently overlap according to the imagination of the person 3000 in the form of the focus puller. Expressed differently, the objective lens 1002 is refocused on the first object O1 to be imaged by the objective lens 1002 and/or the second object O2 to be imaged by the objective lens 1002 should the first object O1 and/or the second object O2 move out of the depth of field ST.

In a further embodiment of the method as per FIG. 11, the method as per FIG. 11 is run through again, starting with method step S1A following method step S5A. In this further embodiment of the method, the created first 3D map is supplemented by renewed recording of the surroundings with the second SLAM module 2001 of AR display and observation device 2000. Expressed differently, changes in the surroundings of the camera 1000 and/or AR display and observation device 2000 are included in the 3D map.

In yet a further embodiment of the method as per FIG. 9B, the method as per FIG. 11 is run through again, starting with method step S1A following method step S9. The explanations provided above likewise apply in that case.

In an embodiment of the method, provision is additionally or alternatively made in method step S2A for a point to be set in a desired depth of field ST, to be precise by (i) observing the point with the AR display and observation device 2000 and/or by (ii) marking the point by means of a manual unit. Reference is made to the explanations in relation to the manual unit provided above. These also apply to the embodiment described here. The recording distance E is determined on the basis of the distance of the point from the objective lens 1002 and is displayed in the AR display and observation device 2000, for example. This is followed by manual or motor-controlled focusing of the objective lens 1002 using the determined recording distance E. In a further embodiment of the method, provision is made for a plurality of points to be selected as described above and for the recording distance E to be determined and displayed in the AR display and observation device 2000 for each of the plurality of points. This makes it easier for the person 3000 in the form of the focus puller to focus the objective lens 1002 as desired, for example when recording a film scene.

In a further embodiment of the method as per FIG. 11, provision is made for virtual markings to be displayed in the AR display and observation device 2000 in a method step S10 as per FIG. 9C, which follows method step S5A, wherein the object O1 and/or the object O2, for example, moves/move along these virtual markings. The virtual markings help the person 3000 in the form of the focus puller better set the depth of field ST, which has to be repeatedly set anew on account of the movement, and better estimate the situation of the recording, that is, the imaging of the object O1 and/or the object O2. Reference is made to the explanations already given above, which also apply to the embodiment described here.

In yet another embodiment of the method as per FIG. 11, provision is made for imaging properties of the objective lens 1002 to also be loaded from the memory unit 1013 into the calculation unit 2009 by means of the first communications device 1009 and the second communications device 2002 when transferring data in method step S3A. Further, the object O1 and/or the object O2 is observed with the AR display and observation device 2000 using the imaging properties of the objective lens 1002. In this embodiment, provision is made for typical properties of the objective lens 1002, in particular image angles and/or aberrations, to be loaded from the memory unit 1013, which may be programmed as an app, for example. The AR display and observation device 2000 now emulates a virtual objective lens and displays an image of the object O1 and/or of the object O2, as would be produced with the imaging properties of the objective lens 1002.

Figure 12A:
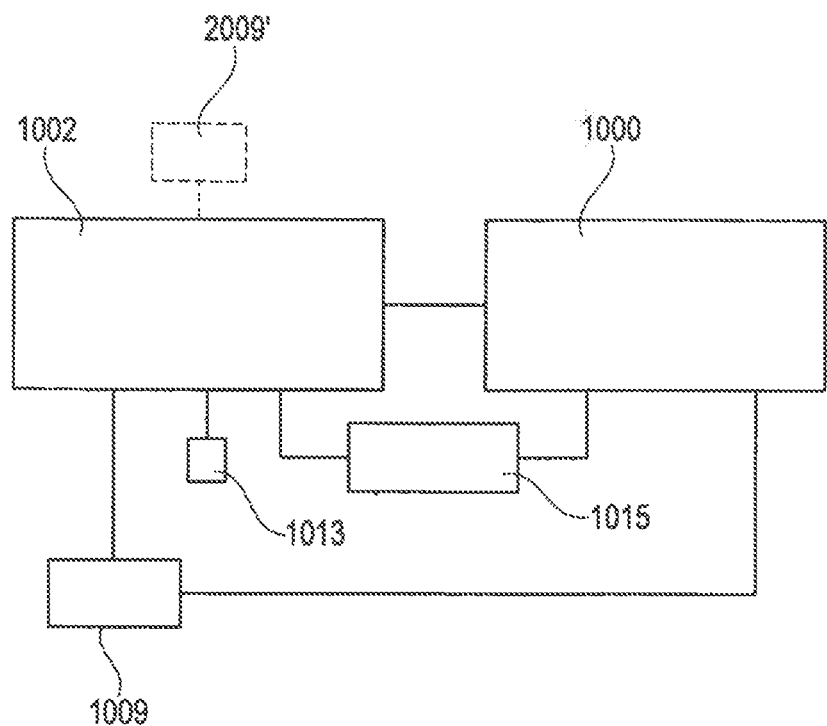
FIG. 12A shows a block diagram of a third embodiment of a system for setting and visualizing parameters for focusing an objective lens of a camera on an object.
Figure 12A:
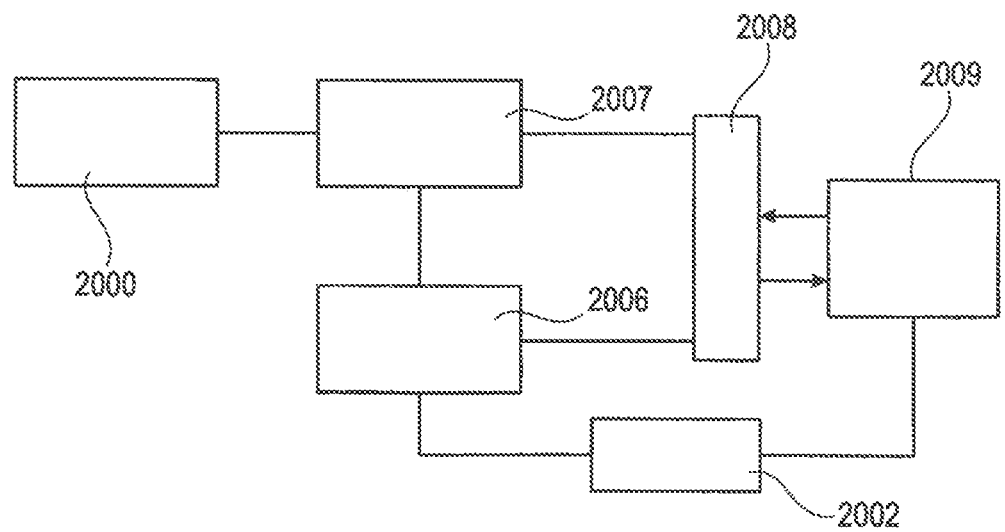
Figure 12B:
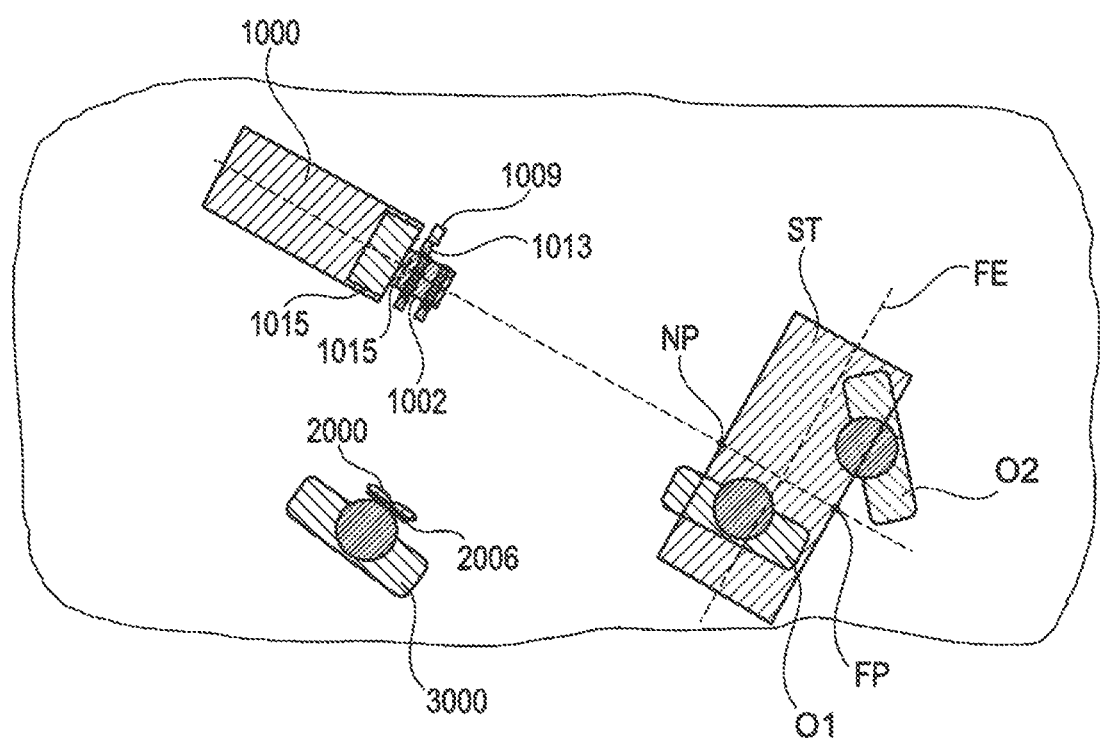
FIG. 12B shows a schematic illustration of the third embodiment of the system according to FIG. 12A; and, FIG. 13 shows a third embodiment of a method for setting and visualizing parameters for focusing an objective lens of a camera on an object.

FIGS. 12A and 12B show a third embodiment of a system for setting and visualizing parameters for focusing an objective lens of a camera on an object. The system according to the third embodiment, which is illustrated in FIGS. 12A and 12B, is based on the first embodiment as per FIGS. 8A and 8B. Identical component parts are provided with identical reference signs. Therefore, reference is made to the explanations provided above, which also apply in this case. In contrast to the first embodiment as per FIGS. 8A and 8B, the third embodiment as per FIGS. 12A and 12B has no first SLAM module on the camera 1000, but a first GPS unit 1015, which further has a first inertial measurement unit. As an alternative thereto, the GPS unit 1015 is disposed on the objective lens 1002, which is elucidated by the dashed lines in FIG. 12B. Moreover, no second SLAM module is provided on the AR display and observation device 2000, but a second GPS unit 2006, which is additionally provided with a second inertial measurement unit. The statements already made above apply accordingly in respect of the first inertial measurement unit. The first inertial measurement unit is used to detect the movement of the camera 1000 or of the objective lens 1002. The first GPS unit 1015 is used to determine the position of the camera 1000 or of the objective lens 1002. By contrast, the second inertial measurement unit is used to detect the movement of the AR display and observation device 2000. The second GPS unit 2006 is used to determine the position of the AR display and observation device 2000.

Explicit reference is made to the fact that the invention is not restricted to the use of GPS units. Rather, any unit of a global navigation satellite system can be used. Reference is made to the explanations given above, which also apply here.

Figure 13:
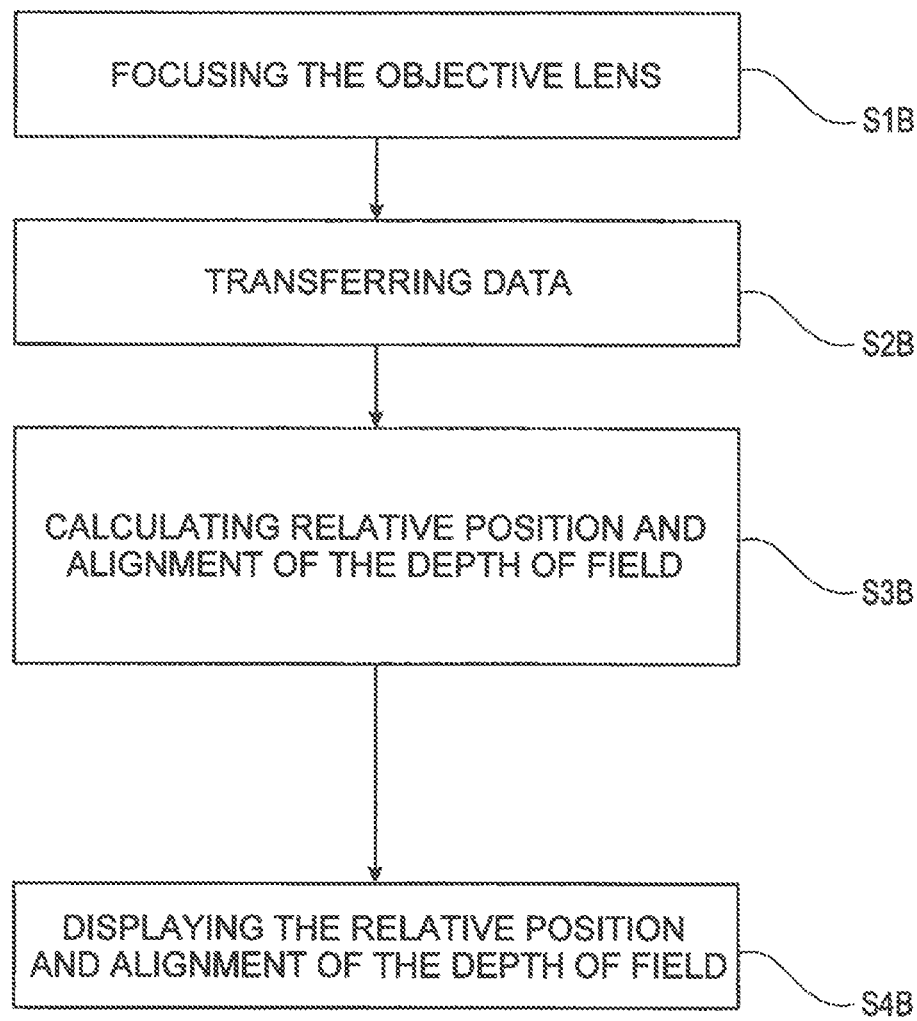

A third exemplary embodiment of the method is now explained on the basis of a flow chart, which is illustrated in FIG. 13. The third embodiment of the method as per FIG. 13 is performed using the third embodiment of the system, which is illustrated in FIGS. 12A and 12B. The processor 1006 of the camera 1000 has a computer program product which controls the third embodiment of the system in FIGS. 12A and 12B in such a way that the third embodiment of the method is carried out. The computer program product is partly or completely loaded into the processor 1006.

The objective lens 1002 of the camera 1000 is focused onto the first object O1 and/or the second object O2 in a method step S1B. To this end, the first lens unit 1004 and/or the second lens unit 1005 of the objective lens 1002 is/are moved along the optical axis OA of the objective lens 1002, for example.

In a method step S2B, there now is a transfer of data of the camera 1000 and of the objective lens 1002 via the first communications device 1009 to the second communications device 2002 of the AR display and observation device 2000. The first communications device 1009 is embodied as a radio device, which can use a plurality of transmission standards and a plurality of transmission paths. In the embodiment illustrated here, objective lens metadata are transferred from the first communications device 1009 to the second communications device 2002 using the Bluetooth transmission standard. The objective lens metadata comprise, in particular, (i) the recording distance E, that is, the distance between the image plane of the objective lens 1002 and the object O1, O2, (ii) the focal length of the objective lens 1002, (iii) a measure for the aperture of the aperture unit of the objective lens 1002, for example the f-number of the objective lens 1002, (iv) the radius of the circle of confusion, (v) the manufacturer of the objective lens 1002, (vi) the name and/or the designation of the objective lens 1002, (vii) a structural design of the objective lens 1002—expressed differently, information items about the optical structure in the form of the employed optical units and/or about the electronic structure of the objective lens 1002—and (viii) a structural configuration of an image capture unit of the camera 1000—expressed differently, information items about the structure of the image capture unit, in particular about the size of the image capture unit.

In a method step S3B, the relative position and the alignment of the depth of field ST of the objective lens 1002 is calculated in the 3D space using the following parameters: the recording distance E between the image plane of the objective lens 1002 and the first object O1 and/or the second object O2, the focal length f of the objective lens 1002, the f-number k of the objective lens 1002 and the radius of the circle of confusion. Expressed differently, the relative position and the alignment of the depth of field ST of the objective lens 1002 are determined with the set and available parameters. The calculation of the relative position and the alignment of the depth of field ST of the objective lens 1002 is implemented in the calculation unit 2009 of the AR display and observation device 2000. As an alternative thereto, the calculation of the relative position and the alignment of the depth of field ST of the objective lens 1002 is implemented in the calculation unit 2009', which was explained above. By way of example, the calculation of the relative position and the alignment of the depth of field ST of the objective lens 1002 is implemented by calculating the near focus distance NF and the far focus distance FF on the basis of the aforementioned formulae [1] and [2], where the depth of field ST of the objective lens 1002 is bounded both by the near focus distance NF and by the far focus distance FF.

The relative position and the alignment of the depth of field ST of the objective lens 1002 is displayed as an image in the AR display and observation device 2000 in method step S4B. The person 3000 in the form of the focus puller can then observe the object O1 and/or the object O2 with the AR display and observation device 2000. At the same time, the relative position and the alignment of the depth of field ST of the objective lens 1002 is displayed. Accordingly, the person 3000 in the form of the focus puller can check whether the object O1 and/or the object O2 is situated partly, completely, or not at all in the depth of field ST of the objective lens 1002.

The depth of field ST is displayed in the AR display and observation device 2000, for example as already explained in respect of the first embodiment of the method as per FIG. 9A. Therefore, reference is made to the explanations given above, which also apply in respect of the embodiment of the method as per FIG. 13.

FIG. 9B shows method steps that can be carried out in a further embodiment of the method according to FIG. 13. In this further embodiment, method step S4B is followed by method step S8, in which the first object O1 to be imaged by the objective lens 1002 of the camera 1000 and/or the second object O2 to be imaged by the objective lens 1002 is/are observed with the AR display and observation device 2000. In method step S9, there is renewed focusing of the objective lens 1002 on the first object O1 to be imaged by the objective lens 1002 and/or the second object O2 to be imaged by the objective lens 1002 if the first object O1 observed by the AR display and observation device 2000 and/or the second object O2 observed by the AR display and observation device 2000 and the image of the relative position and the alignment of the depth of field ST of the objective lens 1002 displayed in the AR display and observation device 2000 no longer sufficiently overlap according to the imagination of the person 3000 in the form of the focus puller. Expressed differently, the objective lens 1002 is refocused on the first object O1 to be imaged by the objective lens 1002 and/or the second object O2 to be imaged by the objective lens 1002 should the first object O1 and/or the second object O2 move out of the depth of field ST.

In a further embodiment of the method as per FIG. 13, the method as per FIG. 13 is run through again, starting with method step S1B following method step S4B. In this further embodiment of the method, changes in the surroundings of the camera 1000 and/or of the AR display and observation device 2000 are determined and used further.

In yet a further embodiment of the method as per FIG. 9B, the method as per FIG. 13 is run through again, starting with method step S1B following method step S9. The explanations provided above likewise apply in that case.

In a yet further embodiment of the method, provision is additionally or alternatively made in method step S1B for a point to be set in a desired depth of field ST, to be precise by (i) observing the point with the AR display and observation device 2000 and determining the position of the point, and/or by (ii) marking the point by means of a manual unit. Reference is made to the explanations in relation to the manual unit provided above. These also apply to the embodiment described here. The recording distance E is determined on the basis of the distance of the point from the objective lens 1002 and is displayed in the AR display and observation device 2000, for example. This is followed by manual or motor-controlled focusing of the objective lens 1002 using the determined recording distance E. In a further embodiment of the method, provision is made for a plurality of points to be selected as described above and for the recording distance E to be determined and displayed in the AR display and observation device 2000 for each of the plurality of points. This makes it easier for the person 3000 in the form of the focus puller to focus the objective lens 1002 as desired, for example when recording a film scene.

In a further embodiment of the method as per FIG. 13, provision is made for virtual markings to be displayed in the AR display and observation device 2000 in a method step S10 as per FIG. 9C, which follows method step S4B, wherein the object O1 and/or the object O2, for example, moves/move along these virtual markings. The virtual markings help the person 3000 in the form of the focus puller better set the depth of field ST, which has to be repeatedly set anew on account of the movement, and better estimate the situation of the recording, that is, the imaging of the object O1 and/or the object O2. Reference is made to the explanations already given above, which also apply to the embodiment described here.

In yet another embodiment of the method as per FIG. 13, provision is made for imaging properties of the objective lens 1002 to also be loaded from the memory unit 1013 into the calculation unit 2009 by means of the first communications device 1009 and the second communications device 2002 when transferring data in method step S2B. Further, the object O1 and/or the object O2 is observed with the AR display and observation device 2000 using the imaging properties of the objective lens 1002. In this embodiment, provision is made for typical properties of the objective lens 1002, in particular image angles and/or aberrations, to be loaded from the memory unit 1013, which may be programmed as an app, for example. The AR display and observation device 2000 now emulates a virtual objective lens and displays an image of the object O1 and/or of the object O2, as would be produced with the imaging properties of the objective lens 1002.

All embodiments of the invention are advantageous in that the previous way of working of the person 3000, namely the anticipation of the distance and the probable movement of the first object O1 and/or the second object O2 and/or the camera 1000, and the readjustment of the focusing by the person 3000, is not impaired by the method. This is because the depth of field ST displayed in the AR display and observation device 2000 assists the person 3000 and does not replace the latter. The person 3000, that is, the focus puller, continues to set the focusing of the objective lens 1002 on the first object O1 and/or on the second object O2 themselves. In so doing, the focus puller has all artistic freedoms. Should the focus puller when observing the first object O1 and/or the second object O2 with the AR display and observation device 2000 identify that the first object O1 and/or the second object O2 is moving out of the depth of field ST, they can readjust the focusing on the first object O1 and/or the second object O2 using embodiments of the method. Thus, the focusing of the objective lens 1002 is set anew. As an alternative thereto, the focus puller can bring about a deliberate defocusing in order to obtain a specific effect in the image. By way of example, this is implemented by virtue of the focusing of the objective lens 1002 not being readjusted or not being readjusted to an extent sufficient for focused imaging.

Since the AR display and observation device 2000 is embodied as a pair of spectacles, a focus puller has the greatest freedom of movement on a film set where the camera 1000 is used. They are not fixed to a position and can move freely on the film set. Consequently, they can readily continue to perceive the scene of a film to be recorded using their eyes, to be precise at a freely chosen location and with a viewing angle depending on the chosen location.

The features of the invention disclosed in the present description, in the drawings and in the claims may be essential for the realization of the invention in the various embodiments thereof, both individually and in arbitrary combinations. The invention is not restricted to the described embodiments. It may be varied within the scope of the claims and taking into account the knowledge of the relevant person skilled in the art.

LIST OF REFERENCE SIGNS

1 Objective lens
2 First object plane
3 Second object plane
1000 Camera
1001 Housing
1002 Objective lens
1003 Image capture unit
1004 First lens unit
1005 Second lens unit
1006 Processor
1007 Monitor
1008 First SLAM module
1009 First communications device
1010 First inertial measurement unit
1011 First depth camera
1012 First surround camera
1013 Memory unit
1014 Marking
1015 First GPS unit
1016 Aperture unit
1017 XD data interface
2000 AR display and observation device
2001 Second SLAM module
2002 Second communications device
2003 Second inertial measurement unit
2004 Second depth camera
2005 Second surround camera
2006 Second GPS unit
2007 Image processor
2008 Coordinate transformation unit
2009 Calculation unit
2009' Calculation unit
3000 Person (focus puller)
BE Image capture unit
D Diameter of the aperture
G Object distance
FF Far focus distance
NF Near focus distance
O Object
OA Optical axis
O1 First object
Second object
P Arrow direction
R Radius
ST Depth of field
S1-S10 Method steps
S1A-S5A Method steps
S1B-S4B Method steps

The invention claimed is:
1. A method for setting and visualizing parameters for focusing an objective lens of a camera on an object, the method comprising the steps:
calculating a relative position and an alignment of a depth of field of the objective lens in a 3D space;
observing at least one of the 3D space and the object with an AR display and observation device;
at least one of displaying the relative position and the alignment of the depth of field of the objective lens as an image in the AR display and observation device and displaying a focal plane as an image in the AR display and observation device; and,
setting the objective lens to obtain a desired depth of field of the objective lens;
wherein the relative position and the alignment of the depth of field of the objective lens are calculated by calculating a far point distance and a near point distance, wherein the far point distance is the distance between the objective lens and a first plane, which is aligned perpendicular to an optical axis of the objective lens and in which a far point is disposed, wherein the near point distance is the distance between the objective lens and a second plane, which is aligned perpendicular to the optical axis of the objective lens and in which a near point is disposed, and wherein the near point distance and the far point distance are specified by the following equations:

$$NF = \frac{\frac{f^2}{k \cdot C} \cdot G}{\frac{f^2}{k \cdot C} + G - f}$$

-continued $$FF = \frac{\frac{f^2}{k \cdot G} \cdot G}{\frac{f^2}{k \cdot C} - G - f}$$

where
NF corresponds to the near point distance,
FF corresponds to the far point distance,
f corresponds to a focal length of the objective lens,
k corresponds to an f-number of the objective lens, specified by $k = f/D$, where f is the focal length and D is a diameter of the entrance pupil of the objective lens,
C is a radius of a smallest circle of confusion, and where
G is an object distance, wherein the object distance corresponds to a distance between an object plane and a principal plane of the objective lens.

2. The method of claim 1, further comprising the step of focusing the objective lens on the object to be imaged by the objective lens when the object observed with the AR display and observation device does not overlap completely, or partially, with the image of the relative position and the alignment of the depth of field of the objective lens displayed in the AR display and observation device.

3. The method of claim 2, wherein the objective lens is focused on the object to be imaged with the objective lens by moving at least one lens unit of the objective lens.

4. The method of claim 1, wherein the relative position and the alignment of the depth of field of the objective lens in the 3D space is calculated using at least one of the following parameters:
(i) a distance between an object plane and a principal plane of the objective lens;
(ii) a focal length of the objective lens;
(iii) a measure for an aperture of an aperture unit of the objective lens; and,
(iv) a radius of the circle of confusion.

5. The method of claim 4, wherein at least one of the parameters is loaded from a data memory into a processor unit for calculating the relative position and the alignment of the depth of field of the objective lens.

6. The method of claim 1, wherein at least one of the following information items is transferred as a data record from a further data memory to the AR display and observation device using at least one communications device:
(i) the relative position and the alignment of the depth of field of the objective lens;
(ii) a distance between an object plane and a principal plane of the objective lens;
(iii) a focal length of the objective lens;
(iv) a measure for an aperture of an aperture unit of the objective lens;
(v) a radius of the circle of confusion;
(vi) a manufacturer of the objective lens;
(vii) at least one of a name and a designation of the objective lens;
(viii) a structural design of the objective lens;
(ix) a structural design of an image capture unit of the camera.

7. The method of claim 6, wherein at least one of the information items is displayed in the AR display and observation device.

8. The method of claim 1, wherein the calculation of the relative position and the alignment of the depth of field of the objective lens in the 3D space is carried out by a calculation unit.

9. The method of claim 8, wherein at least one of
(i) the calculation of the relative position and the alignment of the depth of field of the objective lens in the 3D space is carried out by the calculation unit of the AR display and observation device;
(ii) the calculation of the relative position and the alignment of the depth of field of the objective lens in the 3D space is carried out by the calculation unit of the camera;
(iii) the calculation of the relative position and the alignment of the depth of field of the objective lens in the 3D space is carried out by the calculation unit in the objective lens; and,
(iv) the calculation of the relative position and the alignment of the depth of field of the objective lens in the 3D space is carried out by the calculation unit, which is spatially separated from the AR display and observation device, the camera and the objective lens.

10. The method of claim 1 further comprising the steps:
creating a 3D map by recording surroundings with the AR display and observation device, wherein the 3D map is created on the basis of a coordinate system of the AR display and observation device,
determining a first relative spatial position of the AR display and observation device within the 3D map,
determining a second relative spatial position of at least one of the camera and the objective lens within the 3D map, wherein the second relative spatial position of at least one of the camera and the objective lens is determined with respect to the coordinate system of the AR display and observation device and takes account of a marker disposed on at least one of the camera and the objective lens, and wherein
displaying the relative position and the alignment of the depth of field of the objective lens as an image in the AR display and observation device is implemented using the 3D map.

11. The method of claim 10 further comprising at least one of the following steps:
supplementing the created 3D map by renewed recording of the surroundings with the AR display and observation device; and,
redetermining the second relative spatial position of at least one of the camera and the objective lens within the 3D map.

12. The method of claim 1 further comprising the steps:
creating a first 3D map by recording surroundings with at least one of the camera and a SLAM module, which is disposed on the camera or the objective lens, and determining a first relative spatial position of the camera within the first 3D map, wherein the first 3D map is created on the basis of a first coordinate system, namely the coordinate system of the camera or of the SLAM module, and wherein the first relative spatial position of the camera is determined with respect to the first coordinate system;
creating a second 3D map by recording the surroundings with the AR display and observation device and determining a second relative spatial position of the AR display and observation device within the second 3D map, wherein the second 3D map is created on the basis of a second coordinate system, namely the coordinate system of the AR display and observation device, and wherein the second relative spatial position of the AR display and observation device is determined with respect to the second coordinate system; and, displaying the relative position and the alignment of the depth of field of the objective lens as an image in the AR display and observation device being implemented using a coordinate transformation between the first coordinate system and the second coordinate system.

13. The method of claim 12 further comprising at least one of the following steps:
supplementing the first created 3D map by renewed recording of the surroundings with the camera or the SLAM module;
supplementing the second 3D map by renewed recording of the surroundings with the AR display and observation device;
redisplaying the relative position and the alignment of the depth of field of the objective lens as an image in the AR display and observation device taking account of a change in the position of the camera.

14. The method of claim 1 further comprising the steps:
determining a first relative spatial position of at least one of the camera and of the objective lens using a first inertial measurement unit and a first unit of a global navigation satellite system;
determining a second relative spatial position of the AR display and observation device using a second inertial measurement unit and a second unit of a global navigation satellite system; and,
displaying the relative position and the alignment of the depth of field of the objective lens as an image in the AR display and observation device being implemented using, firstly, the first relative spatial position of the camera and of the objective lens and, secondly, the second relative spatial position of the AR display and observation device.

15. The method of claim 1 further comprising setting a first point in a desired depth of field by at least one of
(i) observing the first point with the AR display and observation device and determining the position of the point; and,
(ii) marking the first point by means of a manual unit.

16. The method of claim 15, further comprising at least one of the following steps:
(i) displaying the first point in the AR display and observation device;
(ii) displaying the distance between the first point and the image plane in the AR display and observation device; and,
(iii) setting the objective lens to obtain the desired depth of field using the distance between the first point and the image plane.

17. The method of claim 1 further comprising displaying virtual markings in the AR display and observation device, wherein the object will move along these virtual markings.

18. The method of claim 1 further comprising loading imaging properties of the objective lens from a data memory and observing the object with the AR display and observation device using the imaging properties of the objective lens.

19. A computer program product comprising program code stored on a non-transitory computer readable storage medium, said program code being partly or completely loadable into a processor; the program code, when executed by the processor, being configured to control a system for setting and visualizing parameters for focusing an objective lens of a camera in such a way that the system:
calculates a relative position and an alignment of a depth of field of the objective lens in a 3D space;
observes at least one of the 3D space and the object with an AR display and observation device;
at least one of: displays the relative position and the alignment of the depth of field of the objective lens as an image in the AR display and observation device and displays a focal plane as an image in the AR display and observation device; and,
sets the objective lens to obtain a desired depth of field of the objective lens;
wherein the relative position and the alignment of the depth of field of the objective lens are calculated by calculating a far point distance and a near point distance, wherein the far point distance is the distance between the objective lens and a first plane, which is aligned perpendicular to an optical axis of the objective lens and in which a far point is disposed, wherein the near point distance is the distance between the objective lens and a second plane, which is aligned perpendicular to the optical axis of the objective lens and in which a near point is disposed, and wherein the near point distance and the far point distance are specified by the following equations:

$$NF = \frac{\frac{f^2}{k \cdot C} \cdot G}{\frac{f^2}{k \cdot C} + G - f}$$

$$FF = \frac{\frac{f^2}{k \cdot G} \cdot G}{\frac{f^2}{k \cdot C} - G - f}$$

where
NF corresponds to the near point distance,
FF corresponds to the far point distance,
f corresponds to a focal length of the objective lens,
k corresponds to an f-number of the objective lens, specified by k =f/D, where f is the focal length and D is a diameter of the entrance pupil of the objective lens,
C is a radius of a smallest circle of confusion, and where
G is an object distance, wherein the object distance corresponds to a distance between an object plane and a principal plane of the objective lens.

20. A system for setting and visualizing parameters for focusing an objective lens of a camera, the system comprising:
at least one camera with an objective lens;
at least one AR display and observation device;
at least one communications device for transferring data between, firstly, at least one of the camera and the objective lens and, secondly, the AR display and observation device;
at least one processor;
a non-transitory computer readable storage medium;
a computer program including program code stored on said non-transitory computer readable storage medium;
said program code being partly or completely loadable into a processor;
said program code being configured, when executed by said at least one processor, to:
calculate a relative position and an alignment of a depth of field of the objective lens in a 3D space;
observe at least one of the 3D space and the object with an AR display and observation device;

at least one of: display the relative position and the alignment of the depth of field of the objective lens as an image in the AR display and observation device and display a focal plane as an image in the AR display and observation device; and, set the objective lens to obtain a desired depth of field of the objective lens;

wherein the relative position and the alignment of the depth of field of the objective lens are calculated by calculating a far point distance and a near point distance, wherein the far point distance is the distance between the objective lens and a first plane, which is aligned perpendicular to an optical axis of the objective lens and in which a far point is disposed, wherein the near point distance is the distance between the objective lens and a second plane, which is aligned perpendicular to the optical axis of the objective lens and in which a near point is disposed, and wherein the near point distance and the far point distance are specified by the following equations:

$$NF = \frac{\frac{f^2}{k \cdot C} \cdot G}{\frac{f^2}{k \cdot C} + G - f}$$

$$FF = \frac{\frac{f^2}{k \cdot G} \cdot G}{\frac{f^2}{k \cdot C} - G - f}$$

where

NF corresponds to the near point distance,

FF corresponds to the far point distance, f corresponds to a focal length of the objective lens, k corresponds to an f-number of the objective lens, specified by k =f/D, where f is the focal length and D is a diameter of the entrance pupil of the objective lens, C is a radius of a smallest circle of confusion, and where G is an object distance, wherein the object distance corresponds to a distance between an object plane and a principal plane of the objective lens.

21. The system of claim 20, wherein said communications device is configured to transfer data between the objective lens and an inertial measurement unit.

22. The system of claim 20 further comprising at least one of:
 (i) at least one first inertial measurement unit;
 (ii) at least one first depth camera;
 (iii) at least one first surround camera; and,
 (iv) at least one first unit of a global navigation satellite system.

23. The system of claim 21, wherein the AR display and observation device includes at least one of:
 (i) at least one second inertial measurement unit;
 (ii) at least one second depth camera;
 (iii) at least one second surround camera; and,
 (iv) at least one second unit of a global navigation satellite system.

* * * * *

UNITED STATES PATENT AND TRADEMARK OFFICE
CERTIFICATE OF CORRECTION

| | |
|---|---|
| PATENT NO. | : 11,210,861 B2 |
| APPLICATION NO. | : 16/860899 |
| DATED | : December 28, 2021 |
| INVENTOR(S) | : Hartmann et al. |

It is certified that error appears in the above-identified patent and that said Letters Patent is hereby corrected as shown below:

On the Title Page

In Column 2:
Under OTHER PUBLICATIONS, Line 2: delete "https://de.wikipedia.Org/w/index.php?title=" and insert -- "https://de.wikipedia.org/w/index.php?title=" -- therefor.
Under (57) ABSTRACT, Line 7: delete "calcu-lating" and insert -- calculating -- therefor.
Under (57) ABSTRACT, Line 10: delete "de-vice" and insert -- device -- therefor.
Under (57) ABSTRACT, Line 14: delete "ob-tain" and insert -- obtain -- therefor.

On Page 2, In Column 2:
Under OTHER PUBLICATIONS, Line 15: delete "EF Lens Work III," and insert -- EF LENS WORK III, -- therefor.

In the Specification

In Column 2:
Line 20: delete "$FF = \dfrac{\dfrac{f^2}{k \cdot G} \cdot G}{\dfrac{f^2}{k \cdot C} - G - f}$" and insert -- $FF = \dfrac{\dfrac{f^2}{k \cdot C} \cdot G}{\dfrac{f^2}{k \cdot C} - G - f}$ -- therefor.

In Column 3:
Line 17: delete "do" and insert -- $d_0$ -- therefor.

In Column 8:
Line 2: delete "$FF = \dfrac{\dfrac{f^2}{k \cdot G} \cdot G}{\dfrac{f^2}{k \cdot C} - G - f}$" and insert -- $FF = \dfrac{\dfrac{f^2}{k \cdot C} \cdot G}{\dfrac{f^2}{k \cdot C} - G - f}$ -- therefor.

Signed and Sealed this
Twenty-seventh Day of September, 2022

*Katherine Kelly Vidal*

Katherine Kelly Vidal
*Director of the United States Patent and Trademark Office*

In Column 34:
Line 24: insert -- O2 -- before "Second object".

In the Claims

In Column 35:

Line 2: delete "$FF = \dfrac{\dfrac{f^2}{k \cdot G} \cdot G}{\dfrac{f^2}{k \cdot C} - G - f}$" and insert -- $FF = \dfrac{\dfrac{f^2}{k \cdot C} \cdot G}{\dfrac{f^2}{k \cdot C} - G - f}$ -- therefor.

In Column 38:

Line 31: delete "$FF = \dfrac{\dfrac{f^2}{k \cdot G} \cdot G}{\dfrac{f^2}{k \cdot C} - G - f}$" and insert -- $FF = \dfrac{\dfrac{f^2}{k \cdot C} \cdot G}{\dfrac{f^2}{k \cdot C} - G - f}$ -- therefor.

In Column 39:

Line 26: delete "$FF = \dfrac{\dfrac{f^2}{k \cdot G} \cdot G}{\dfrac{f^2}{k \cdot C} - G - f}$" and insert -- $FF = \dfrac{\dfrac{f^2}{k \cdot C} \cdot G}{\dfrac{f^2}{k \cdot C} - G - f}$ -- therefor.